United States Patent
Cherkasova

(10) Patent No.: US 7,779,096 B2
(45) Date of Patent: Aug. 17, 2010

(54) SYSTEM AND METHOD FOR MANAGING A SHARED STREAMING MEDIA SERVICE

(75) Inventor: Ludmila Cherkasova, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2242 days.

(21) Appl. No.: 10/601,357

(22) Filed: Jun. 23, 2003

(65) Prior Publication Data

US 2004/0260811 A1 Dec. 23, 2004

(51) Int. Cl.
*G06F 13/00* (2006.01)

(52) U.S. Cl. .................. 709/223; 709/231; 709/226; 709/225

(58) Field of Classification Search ............... 709/223, 709/231, 226, 225, 229
See application file for complete search history.

(56) References Cited

U.S. PATENT DOCUMENTS

| | | | |
|---|---|---|---|
| 5,732,239 | A | 3/1998 | Tobagi et al. |
| 5,734,119 | A | 3/1998 | France et al. |
| 5,815,662 | A | 9/1998 | Ong |
| 6,101,547 | A | 8/2000 | Mukherjee et al. |
| 6,178,480 | B1 | 1/2001 | Tobagi et al. |
| 6,434,621 | B1 | 8/2002 | Pezzillo et al. |
| 6,466,980 | B1 | 10/2002 | Lumelsky et al. |
| 7,228,354 | B2 * | 6/2007 | Chambliss et al. .......... 709/229 |
| 2002/0083124 | A1 | 6/2002 | Knox et al. |
| 2002/0091722 | A1 | 7/2002 | Gupta et al. |
| 2002/0120741 | A1 * | 8/2002 | Webb et al. ............... 709/225 |
| 2002/0129048 | A1 | 9/2002 | Qiu et al. |
| 2002/0150102 | A1 | 10/2002 | Janko et al. |
| 2002/0152305 | A1 * | 10/2002 | Jackson et al. ............. 709/224 |
| 2002/0156552 | A1 | 10/2002 | Whiting |
| 2003/0046396 | A1 * | 3/2003 | Richter et al. ............. 709/226 |
| 2004/0003087 | A1 * | 1/2004 | Chambliss et al. .......... 709/226 |
| 2004/0103189 | A1 | 5/2004 | Cherkasova et al. |
| 2004/0260619 | A1 | 12/2004 | Cherkasova et al. |

OTHER PUBLICATIONS

Chase, J. et al., "Managing Energy and Server Resources in Hosting Centers," Dept. of Computer Science, Duke University, 14 pages.
Eager, D. et al., "Optimal and Efficient Merging Schedules for Video-on-Demand Servers," Proc. ACM Multimedia 1999, 4 pages.
Nahrstedt, K. et al., "A Probe-based Algorithm for QoS Specification and Adaptation," Univ. of Illinois at Urbana Champaign, pp. 1-12.
Nahrstedt, K. et al., "QoS-Aware Resource Managment for Distributed Multimedia Applications," Univ. of Illinois at Urbana Champaign, Dept. of Computer Science, pp. 1-37.

(Continued)

*Primary Examiner*—Kenneth R Coulter

(57) ABSTRACT

Methods and systems for managing admission of requests to hosting services that share resources are provided. In certain embodiments, a method comprises allowing each of a plurality of hosting services access to any of a set of shared resources for serving their respective streaming files to clients. The method further comprises managing admission of client requests for streaming files to each of the plurality of hosting services to ensure that a desired amount of usage of the shared resources is available to each hosting service.

18 Claims, 6 Drawing Sheets

OTHER PUBLICATIONS

Ranjan, S. et al., "QoS-Driven Server Migration for Internet Data Centers," Proc. Of IWQoS 2002, 10 pages.

Shenoy, P. et al., "Middleware versus Native OS Support: Architectural Considerations for Supporting Multimedia Applications," Univ. of Massachusetts, Dept. of Computer Science, 10 pages.

Cherkosova, L. et al., "Building a Performance Model of Streaming Media Applications in Utility Data Center Environment," Hewlett-Packard Laboratories, Internet Systems and Storage Lab, 12 pages.

Acharya, S. et al., "Characterizing User Access to Videos on the World Wide Web," Part of the IS&T/SPIE Conference on Multimedia computing and Networking 2000, SPIE vol. 3969, 2000, pp. 130-141.

Almeida, J. et al., "Analysis of Educational Media Server Workloads," Proc. 11th Int'l. Workshop, 2001, 10 pages.

Dan, A. et al., "Buffering and Caching in Large-Scale Video Servers," IEEE 1995, pp. 217-224.

Kim, I. et al., "VBR Video Data Scheduling using Window-Based Prefetching," IEEE 1999, pp. 159-164.

Cherkasova, L. et al., "Characterizing Locality, Evolution, and Life span of Accesses in Enterprise Media Server Workloads," NOSSDAV '02, May 12-14, 2002, 10 pages.

* cited by examiner

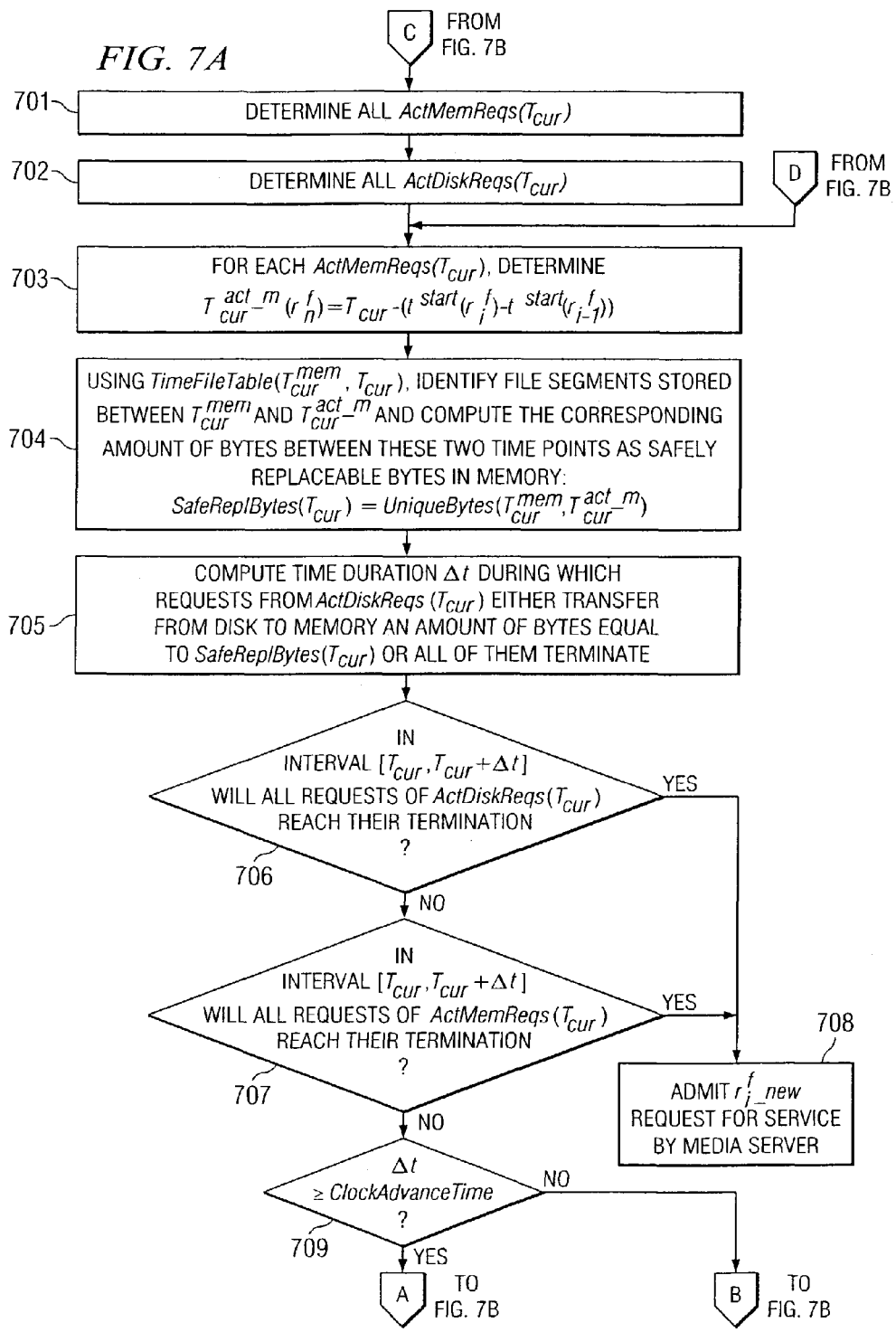

US 7,779,096 B2

SYSTEM AND METHOD FOR MANAGING A SHARED STREAMING MEDIA SERVICE

CROSS-REFERENCE TO RELATED APPLICATIONS

This application is related to and commonly assigned U.S. patent application Ser. No. 10/306,279 filed Nov. 27, 2002 entitled "SYSTEM AND METHOD FOR MEASURING THE CAPACITY OF A STREAMING MEDIA SERVER," (now U.S. Patent Application Publication. No. 20040103189) the disclosure of which is hereby incorporated herein by reference. This application is also related to concurrently filed and commonly assigned U.S. patent application Ser. No. 10/601,992 filed Jun. 23, 2003 entitled "COST-AWARE ADMISSION CONTROL FOR STREAMING MEDIA SERVER," (now U.S. Patent Application Publication No. 20040260619) the disclosure of which is hereby incorporated herein by reference.

FIELD OF THE INVENTION

The present invention relates in general to admission control strategies and more specifically to systems and methods for managing the admission of requests to a shared media server that comprises a plurality of hosting services implemented thereon such that the shared resources are used by the hosting services in a desired (e.g., "fair") manner.

DESCRIPTION OF RELATED ART

Today, much information is stored as digital data that is available to processor-based devices via client-server networks. Client-server networks are delivering a large array of information (including content and services) such as news, entertainment, personal shopping, airline reservations, rental car reservations, hotel reservations, on-line auctions, on-line banking, stock market trading, as well as many other services and types of content. Such information providers (sometimes referred to as "content providers") are making an increasing amount of information available to users via client-server networks.)

An abundance of information is available on client-server networks, such as the Internet, Intranets, the World Wide Web (the "web"), other Wide and Local Area Networks (WANs and LANs), wireless networks, and combinations thereof, as examples, and the amount of information available on such client-server networks is continuously increasing. Further, users are increasingly gaining access to client-server networks, such as the web, and commonly look to such client-server networks (as opposed to or in addition to other sources of information) for desired information. For example, a relatively large segment of the human population has access to the Internet via personal computers (PCs), and Internet access is now possible with many mobile devices, such as personal digital assistants (PDAs), mobile telephones (e.g., cellular telephones), etc.

An increasingly popular type of technology for providing information to clients is known as "streaming media." Streaming media is a well-known technology in the computer arts. In general, streaming media presents data (e.g., typically audio and/or video) to a client in a streaming or continuous fashion. That is, with streaming media a client is not required to receive all of the information to be presented before the presentation begins. Rather, presentation of information in a streaming media file may begin before all of the file is received by the client, and as the received portion of the file is being presented, further portions of the file continue to be received by the client for later presentation. Thus, streaming media involves media (e.g., typically audio and/or video) that is transmitted from a server (a media server) to a client and begins playing on the client before fully downloaded.

Streaming media is a particularly popular technique for communicating audio and/or video files from a server to a client. Audio and video files tend to be quite large, even after being compressed. If streaming media is not used, an entire file is generally required to be downloaded to a client before the client can begin to play the file. Such a download may require an undesirably long delay before the client can begin playing the file. With streaming media (e.g., streaming audio or streaming video), a client is not required to wait until the entire file is downloaded to play it. Instead, the client can begin playing the file (e.g., presenting the video and/or audio to a user) while it downloads to the client.

Streaming media has quickly become the most popular form of multimedia content on the Internet. Video from news, sports, and entertainment sites are more popular than ever. Media servers are also being used for educational and training purposes by many universities. Further, use of media servers in the enterprise environment is also gaining momentum. Many radio broadcasts are available over the Internet, which make use of streaming audio to enable a much wider audience access to their broadcasts.

In view of the above, the area of multimedia services in a networked environment is a rapidly expanding field in today's technological world. The delivery of continuous media from a central server complex to a large number of (geographically distributed) clients is a challenging and resource intensive task. Media servers are commonly implemented for providing streaming media to clients. Various streaming media files may be provided concurrently by a media server to various different clients. That is, a plurality of clients may concurrently access streaming media files from the media server. Of course, limits exist as to how many concurrent streams a media server can support for a given client population. That is, limits exist as to the capacity of a media server for supporting a given "workload" (i.e., a number of concurrent client accesses of streaming media from the media server).

Further, oftentimes a single server (or server cluster) may be used for providing hosting services for a plurality of different customers. For instance, "media content hosting" is an increasingly common practice, in which providers who have a large amount of resources offer to store and provide access to media files from institutions, companies and individuals who are looking for a cost efficient, "no hassle" solution. In general, a shared media hosting service creates a set of virtual servers on the same server (or server cluster). This supports the illusion that each host has its own media server, when in reality, multiple "logical hosts" may share one physical host. Thus, the physical resources of a server (or server cluster) may be shared by a plurality of "logical hosts" that may each be hosting services for different entities (or customers).

BRIEF SUMMARY OF THE INVENTION

In certain embodiments of the present invention, a method for managing admission of requests to a shared media server is provided. The method comprises allowing each of a plurality of hosting services access to any of a set of shared resources for serving their respective streaming files to clients. The method further comprises managing admission of client requests for streaming files to each of the plurality of hosting services to ensure that a desired amount of usage of the shared resources is available to each hosting service.

In certain embodiments, a system is provided. The system comprises a media server comprising a plurality of hosting services for streaming files implemented thereon, wherein the media server comprises shared resources and wherein the plurality of hosting services share usage of the media server's shared resources in serving streaming files to their respective clients. The system further comprises an admission controller for managing admission of client requests for service to each of the plurality of hosting services to ensure that no one of the plurality of hosting services overtakes usage of an undesirably high proportion of the shared resources.

In certain embodiments, a method for managing admission of requests to hosting services that share resources is provided. The method comprises allowing each of a plurality of hosting services access to any of a set of shared resources for serving their respective files to clients thereof, and, for each of the plurality of hosting services, identifying a desired amount of usage of the set of shared resources to be available for the hosting service. The method further comprises isolating usage of the set of shared resources by the plurality of hosting services to ensure that the respective desired amount of usage of the set of shared resources is available to each hosting service.

In certain embodiments, a method for managing admission of requests to a hosting service comprises allowing each of a plurality of hosting services access to any of a set of shared resources for serving their respective files to clients thereof, and, for each of the hosting services, identifying a desired amount of usage of the set of shared resources to be available for the hosting service. The method further comprises receiving a new request for a streaming file to be served by one of the hosting services, and determining a cost to the one of the hosting services for serving the requested streaming file, wherein the cost corresponds to the shared resources to be consumed in serving the requested streaming file. The method further comprises determining, based at least in part on the cost, whether to admit the new request for service by the one of the hosting services.

In certain embodiments, a method comprises allowing each of a plurality of hosting services access to any of a set of shared resources for serving their respective files to clients thereof, wherein the shared resources includes a memory, and receiving, at a time $T_{cur}$, a new request for a streaming file to be served by one of the hosting services. The method further comprises creating a segment-based model of the memory as of time $T_{cur}$, and, based at least in part on the segment-based model of the memory, determining whether to accept the received request for service by the hosting service.

In certain embodiments, computer-executable software stored to a computer-readable medium is provided. The computer-executable software comprises code for creating a segment-based model of a media server's memory, wherein the media server's memory is a shared resource to which a plurality of hosting services implemented on the media server have access for serving their respective files to clients thereof. The computer-executable software further comprises code for determining whether to serve a requested streaming file from one of the plurality of hosting services based at least in part on the segment-based model of the media server's memory.

In certain embodiments, an admission controller for managing admission of requests to hosting services that share resources is provided,. The admission controller comprises means for receiving a new request for a streaming file to be served by one of a plurality of hosting services that share access to a set of shared resources for serving their respective files to clients thereof. The admission controller further comprises means for performing a resource availability check for the one of a plurality of hosting services from which the streaming file is requested by the new request to determine whether the requested hosting service has sufficient available resource usage allocated thereto to service the new request, and means for performing performance isolation guarantee check for the plurality of hostingservices to determine whether acceptance of the new request will violate, at any point in the future, availability of a desired amount of usage of the shared resources for any of the plurality of hosting services.

BRIEF DESCRIPTION OF THE DRAWINGS

FIGS. 7A-7B show an example operational flow diagram for performance isolation validation that is performed by an admission controller in accordance with one embodiment of the present invention;

DETAILED DESCRIPTION

Figure 1:
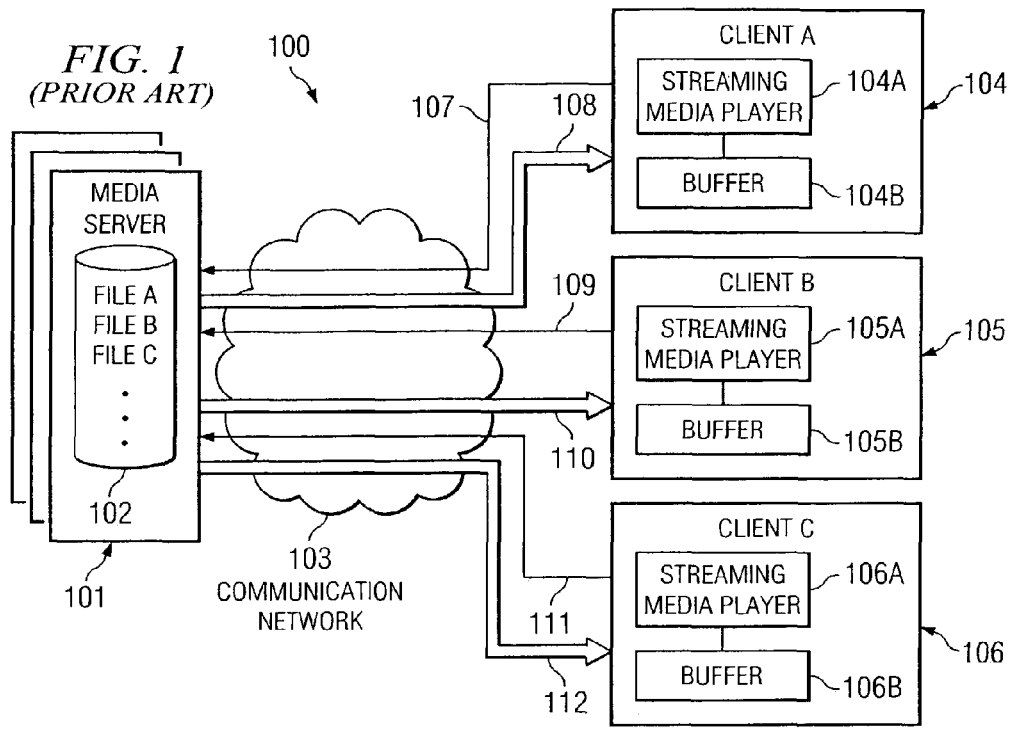
FIG. 1 shows an example client-server system in which embodiments of the present invention may be implemented.

Embodiments of the present invention provide a system and method for managing a shared media hosting service. For instance, a shared media hosting service may implement a plurality of "logical hosts" (also referred to herein as "hosting services" or "media services") that share common physical resources (e.g., the resources of a single server or server cluster). Embodiments of the present invention enable managing access to the plurality of logical hosts to ensure that the shared resources are utilized in a desired (e.g., fair) manner.

As an example, a shared media server may comprise a plurality of hosting services implemented thereon. For instance, a shared media server may comprise a plurality "k" of hosting services s (i.e., $s_1, \ldots, s_k$), and embodiments of the present invention may be used for managing the amount of usage of the shared resources by each of the hosting services to ensure that each hosting service has a desired amount of resources available for its use. For instance, in certain embodiments, each hosting service $s_i$ may be allocated a predetermined amount of resource usage (or capacity), which may, for example, be allocated in accordance with each of the hosting services' respective Service Level Agreement (SLA), and an admission controller may be implemented to manage the admission of client requests for service to each of the hosting services to ensure that a desired amount of capacity is available for each hosting service. As described further below, certain embodiments utilize performance isolation to ensure that usage of the shared resources by one hosting service does not dominate an undesirably high amount of the shared resources so that other hosting services are assured of having a desired (e.g., predetermined) amount of resources available for their use.

Thus, certain embodiments of the present invention provide the ability to enforce performance isolation (or resource usage isolation) among the plurality of hosting services. Accordingly, through such performance isolation, each hosting service implemented on a common set of physical resources (e.g., a common server or server cluster) can be assured to have available thereto a sufficient amount of resource usage to ensure a desired level of service for the hosting service in accordance with certain embodiments. For instance, the performance isolation may be implemented to ensure each hosting service a "fair" share of resource usage. As an example, a service provider implementing the shared media hosting service may enter into a SLA with each entity for which it provides hosting services, wherein the service provider may agree that $Z_s\%$ of the shared resources will be allocated to a designated hosting service s. Certain embodiments of the present invention utilize performance isolation to ensure that a predetermined percentage of shared resources (e.g., as may be set forth in a SLA) is allocated to a corresponding hosting service.

Accordingly, an embodiment of the present invention enables isolation of resource usage for hosting services. In this manner, any of the shared resources may be available to each hosting service, but the resource usage is managed to ensure availability of desired levels of resources for each hosting service. Thus, the physical resources need not be isolated or pre-designated to a given hosting service (e.g., through partitioning, etc.), but instead the usage of the physical resources may be managed through usage isolation, as described further below. Of course, access to the physical resources by a hosting service may be restricted or pre-allocated through partitioning or other technique for isolating the physical resources, and within a given set of resources (e.g., within a given partition) the usage isolation techniques described below may be utilized. For instance, a server may be partitioned into two partitions of resources, and a plurality of hosting services may be implemented on each of the partitions (such that the plurality of hosting services share the resources of their partition), wherein the usage isolation techniques described below may be employed for managing the resource usage of the hosting services on each partition. Thus, each hosting service supported by a shared media server may be allowed access to any of the shared resources (i.e., the resources that are shared between a plurality of different logical hosts), and the usage of the shared resources is managed (e.g., through usage isolation) such that no hosting service overtakes usage of an undesirably high proportion of the shared resources.

Thus, embodiments of the present invention may be utilized for managing admission of requests to media servers that are implemented to share a common set of resources. For instance, a cost-aware admission control system for such a shared media server is provided, wherein a cost is determined for a received request and such cost is used to determine whether the media server can support such request. More specifically, an example embodiment of the present invention utilizes a cost-aware admission control system wherein upon receiving a request for service by a hosting service $s_i$ of a plurality "k" of hosting services implemented on the shared media server, a cost for the request is determined and such cost is used to determine whether the requested hosting service $s_i$ has sufficient capacity (e.g., sufficient amount of its preallocated resource usage) available to service the request. In accordance with an embodiment of the present invention, the current memory state of a shared media server at any given time may be determined through a memory state model. Such modeling of the media server's memory state provides a close approximation of the real system memory but reflects a higher-level memory abstraction.

As described further below, certain embodiments of the present invention enable the memory state of a shared media server to be efficiently determined, which enables such modeling of the memory state to be used, for example, in implementing an admission control system for managing the acceptance of requests to be serviced by one of a plurality of hosting services implemented on the shared media server. In accordance with an embodiment of the present invention, from the modeled memory state, a determination of the streaming files (or file segments) present in the media server's memory at any given time can be intelligently estimated. Accordingly, a determination of the media server's resources that will be consumed in servicing a newly received request for any of the plurality of hosts may be computed. That is, the memory state may be used to efficiently determine whether the-memory resources or the disk resources of the shared media server will be consumed in servicing a newly received request for a particular streaming file.

Thus, a "cost" of the media server's resources required for servicing the received request (e.g., whether memory resources or disk resources will be utilized) may be determined for the request, and such cost may be utilized for determining whether the request should be admitted for service by the media server or whether admitting such request would result in overloading the media server such that the quality of service provided by the media server degrades below a desired level. Further, the cost of the media server's resources required for servicing the received request may be utilized for determining whether such request would result in an undesirably high consumption of resources by the requested one of the plurality of hosting services implemented on the shared media server. Thus, modeling of the shared media server's memory state may be used for implementing an admission control policy for determining whether a hosting service implemented on the media server can service a newly received client request without consuming too much of the shared resources (so as to avoid undesirably degrading the quality of service provided by the media server for the other hosting services).

Certain embodiments of the present invention utilize a segment-based access model for representing unique, most recently accessed segments of a file. Such a segment-based access model may be used for efficiently computing a media server's memory state, as described further below. That is, considering that a streaming file may be concurrently accessed (or have overlapping accesses thereto), various portions (or segments) of the streaming file may have different time stamps at which they have been most recently accessed by a client. As used herein, a streaming file is intended to encompass any type of file now known or later discovered that is served in a streaming fashion. Examples of a streaming file include well-known streaming media files, such as streaming audio and/or streaming video files.

For example, a first client may request, at time t=0 seconds, access to a streaming media file f that is 600 seconds in duration, and a second client may request access to such streaming media file f 10 seconds later, at time t=10 seconds. Given the real-time nature of streaming media files, at time t=50 seconds, the first client will have accessed 50 seconds of file f (i.e., the segment from 0 seconds to 50 seconds of file f), and the second client will have accessed 40 seconds of file f (i.e., the segment from 0 seconds to 40 seconds of file f). However, the second client's access of the segment 0-40 seconds of file f is more recent than the first client's access of that segment. That is, the second client's access of the segment 0-40 seconds of file f started at time t=10 seconds, whereas the first client's access of that segment started at time t=0 seconds. But, the first client has most recently accessed the segment 40-50 seconds of file f (i.e., such access of segment 40-50 seconds of file f was started by the first client at time t=40 seconds), and the second client has not yet accessed this segment at all. A segment-based access model of an embodiment of the present invention is utilized for filed to represent that segment 0-40 seconds of file f was most recently accessed starting at time t=10 seconds and segment 40-50 seconds of file f was most recently accessed starting at time t=40 seconds. Again, such a segment-based access model for streaming media files is utilized in certain embodiments of the present invention to enable a memory state of a media server to be efficiently computed.

Further, by computing the memory state from the segment-based access model in accordance with certain embodiments, a segment-based model of the media server's memory results. That is, a segment-based model of the media server's memory may be determined, as opposed to the real organization (e.g., "page" organization) of the memory. Such a segment-based model of the memory enables efficient determination of the content of such memory over time (e.g., determination of the file segments that are evicted from memory in favor of inserting new file segments into memory, etc.).

Thus, as described further below, an embodiment of the present invention provides a cost-aware admission control strategy for a media server that efficiently utilizes the available media server resources (e.g., the media server's capacity) to support an optimum number of requests (or an optimum "workload") to each of a plurality of hosts implemented on the media server, while ensuring that desired quality of service ("QoS") guarantees are satisfied for each host. By using such a cost-aware admission control strategy in which each media request is characterized via a cost function defining a fraction of system resources needed to support the corresponding media stream, an admission controller of an embodiment of the present invention provides a powerful mechanism for tailored allocation of shared resources with performance isolation among the services.

Various embodiments of the present invention are now described with reference to the above figures, wherein like reference numerals represent like parts throughout the several views. Turning first to FIG. 1, an example client-server system 100 is shown in which embodiments of the present invention may be implemented. Client-server system 100 comprises a plurality of clients 104, 105, and 106, and a media server (or complex of media servers) 101. As used herein, a media server (or "streaming media server") is intended to encompass any processor-based device now known or later developed that is capable of serving one or more streaming files to clients thereof. Of course, such a media server (or "streaming media server") may be further operable to also serve other types of files to its clients. Clients 104-106 are each capable of communicatively accessing media server(s) 101 via communication network 103. Communication network 103 is preferably a packet-switched network, and in various implementations may comprise, as examples, the Internet or other Wide Area Network (WAN), an Intranet, Local Area Network (LAN), wireless network, Public (or private) Switched Telephony Network (PSTN), a combination of the above, or any other communications network now known or later developed within the networking arts that permits two or more computing devices to communicate with each other.

Media server(s) 101 of the illustrated embodiment comprise data storage 102 for storing streaming media files, such as File A, File B, and File C. Data storage 102 may comprise internal or external disk drives, floppy disks, optical disks, Compact Discs (CDs), Digital Versatile Discs (DVD), memory, and/or other data storage devices now known or later developed for storing digital data. For instance, as described further below, data storage 102 typically comprises at least disk resources and memory resources for storing streaming media files (or segments thereof). In operation, a client may request a streaming media file available from media server 101, and such media server 101 may serve the streaming media file as a stream to the requesting client via communication network 103. That is, a client may request a particular content (e.g., audio, video, or other type of content) and media server 101 may serve a streaming media file as a stream to provide the requested content to the requesting client.

Media server 101 may comprise streaming media file(s) that is/are encoded for transmission at each of a plurality of different bit rates. For example, a streaming media file, File A, may comprise a particular content and it may be encoded for transmission at a plurality of different bit rates, such as 28 Kb/s, 56 Kb/s, and/or various other bit rates. Each resulting version of the file encoded for transmission at a given bit rate may be stored to data storage 102, e.g., File $A_1$ encoded for transmission at 28 Kb/s and File $A_2$ encoded for transmission at 56 Kb/s may each be stored to data storage 102 (note that files $A_1$ and $A_2$ comprise substantially the same content but are encoded for transmission at different bit rates, and thus the quality of each file may differ). As used herein, a file encoded for transmission at a particular bit rate may be referred to as a file encoded at the particular bit rate. In common phraseology in the art, a streaming media file is referred to as being "encoded at a particular bit rate", which means the file is encoded for transmission from the server at the particular bit rate. Thus, as used herein, the phrase "encoded at a bit rate" when describing a streaming media file means the streaming media file is encoded for transmission at the bit rate, as is consistent with common phraseology in the streaming media art.

Media server 101 generally attempts to serve the most appropriate encoded file to a client based at least in part on the client's access speed to the client-server network 103. For example, suppose client 104 has a 28 Kb/s speed connection to communication network 103, client 105 has a 56 Kb/s speed connection to communication network 103, and media server 101 comprises File $A_1$ encoded at 28 Kb/s and File $A_2$ encoded at 56 Kb/s stored to data storage 102; when client 104 requests the content of File A, media server 101 typically attempts to serve File $A_1$ to client 104 (as File $A_1$ is the highest-quality encoded file supportable by client 104's connection speed), and when client 105 requests the content of File A, media server 101 typically attempts to serve File $A_2$ to client 105 (as File A$_2$ is the highest-quality encoded file supportable by client 105's connection speed). However, in the above example, suppose that media server 101 does not have File A encoded at 56 Kb/s but instead comprises File A$_1$ encoded at 28 Kb/s and File A$_2$ encoded at 112 Kb/s; then upon client 105 requesting the content of File A, media server 101 typically attempts to serve File A$_1$ to client 105, as File A$_1$ is the highest-quality encoded file providing the requested content that is encoded at a suitable bit rate that client 105's connection can support.

Typically, a streaming media player is executed by the requesting client for playing the received stream. Various types of streaming media technologies exist. Popular streaming media players include those provided by RealNetworks™ (see http://www.realnetworks.com), such as its RealPlayer™ and RealOnePlayer™ streaming media players, and that used by Microsoft's Windows® Media Player (see http://www.microsoft.com), as examples. For instance, clients 104, 105, and 106 comprise streaming media players 104A, 105A, and 106A, respectively, executing thereon for playing received streams in the example of FIG. 1. Typically, each streaming media player has a buffer associated therewith, such as buffers 104B, 105B, and 106B shown in the example of FIG. 1, for buffering received streamed data to improve the continuity of the playback of such streamed data by the streaming media player.

As an example of a typical scenario for a user accessing an audio stream via the web, the user will typically use a web browser, such as Netscape's Navigator™, Microsoft's Internet Explorer™, or other web browser now known or later developed, to request access to audio content (e.g., a RealPlayer sound clip) by, for example, clicking a link to such audio content provided on a web page being served by a web server. Assuming, for instance, that the requested audio content is included in a RealPlayer sound file, the web server sends back to the browser a file called a RealPlayer metafile, which is a small text file that has the true location (e.g., the Universal Resource Locator (URL)) of the requested RealPlayer sound file and also has instructions instructing the web browser to launch the RealPlayer sound player. For instance, client 104 may submit request 107 for desired streaming audio content by, for example, clicking on a hyperlink to such streaming audio content. If a suitable streaming media player 104A (e.g., a RealPlayer media player in the above example) is not already executing on client 104, media server 101 may return instructions launching such streaming media player 104A.

The streaming media player 104A contacts the URL contained in the received metafile. It should be recognized that often the URL contacted for accessing the desired audio stream is not on the web server from which the audio file was requested. Rather, the audio stream is often on a different media server (e.g., a RealPlayer server in the above example) designed to deliver streaming media files. For instance, in FIG. 1, client 104 may access a web server (not shown) and a user may click on a hyperlink provided on a web page being served by such web server to request desired audio content. The web server may return a metafile to the client indicating the URL of the corresponding sound file and launching streaming media player 104A if it is not already executing. The URL of the sound file may identify media server 101, which is designed for delivering streaming media files, such as those stored to data storage 102, and streaming media player 104A may therefore contact media server 101 (via request 107 in this example).

Media server 101 (e.g., a RealPlayer server in this example) and streaming media player 104A (e.g., a RealPlayer media player in this example) may interact with each other so that the server knows at what speed client 104 is connected to the Internet. If the connection is a low-speed connection, a streaming audio file encoded at a lower bit rate is typically sent. This will generally be a file of lesser quality than a file encoded at a higher bit rate and destined for a high-speed connection. If a high-speed connection is used, a larger, higher-quality sound file encoded at a higher bit rate is typically sent, which will generally provide for better sound quality. The requested audio file is then sent in Internet Protocol (IP) packets, typically using either the User Datagram Protocol (UDP) or the Internet's normal Transmission Control Protocol (TCP). UDP does not keep re-sending packets if they are misplaced or other problems occur, as does TCP, which may be preferable for certain streaming media technologies.

Thus, media server 101 serves the requested audio content to client 104 as stream 108. The packets are sent to buffer 104B on client 104, and once the buffer is filled, the packets begin being sent from the buffer to streaming media player 104A and it begins playing the audio file. As the file is being played remaining portions of the file are still transmitted from media server 101 to client 104 and are buffered in buffer 104B. If packets are not replenished to buffer 104B fast enough, then interruptions in the playback by the streaming media player 104A may occur, thus degrading the quality of the audio stream perceived by the user.

Steaming video may be communicated from media server 101 to a client in a similar manner as that described above for streaming audio. For instance, client 105 may submit request 109 for desired streaming video content. The requested video file is then sent in IP packets, typically using UDP. Thus, media server 101 serves the requested video file to client 105 as stream 110. The packets are sent to buffer 105B, and once the buffer fills up, the video begins being played by streaming media player 105A. As the file is being played, remaining video packets of the file are still transmitted from media server 101 to client 105 and are buffered in buffer 105B. If packets are not replenished to buffer 105B fast enough, then interruptions in the playback by streaming media player 105A may occur, thus degrading the quality of the video stream perceived by the user. Once all of the video data has been received and played by streaming media player 105A, the video stops. The video file generally does not remain on the client's system, but rather each section of the file is typically discarded after it is played.

As further shown in FIG. 1, client 106 may request streaming media content (e.g., a streaming audio and/or video file) from server 101 via request 111, and media server 101 may provide the requested content as stream 112 to client 106. While three clients are shown in this example, it should be recognized that many more clients may, in certain implementations, be concurrently accessing one or more streaming media files from media server 101. As described above, limits exist as to how many concurrent streams media server 101 can support for a given client population. Thus, it may become desirable to measure the capacity of a media server for supporting workloads applied thereto.

In order to measure the capacity of a media server for supporting a received client request, for example, it may be desirable to determine the impact that servicing such received client request will have on the media server's resources. That is, it may be desirable to determine whether servicing the received client request will impact the media server's memory resources or disk resources. As described further below, embodiments of the present invention provide a cost-aware admission control system for managing the admission of requests to be serviced by a media server. Certain embodiments utilize a memory model for efficiently modeling the media server's memory, wherein such memory model may be used to determine whether a requested file can be served from the media server's memory or whether such requested file is not present in memory and must be served from the media server's disk. From such determination of whether the requested file can be served from the media server's memory, a resource "cost" may be determined for the request, and such cost may be used in an admission controller to determine whether the request should be accepted for service by the media server.

Further, while a client requests streaming media content in each of the above examples, it should be recognized that in some implementations a streaming media file may be "pushed" from media server 101 to a client without the client specifically requesting such file. For instance, upon a client visiting a particular web page, the web page may cause a streaming media file (e.g., an advertisement) to be sent to the client. It should be understood that embodiments of the present invention are applicable to any such utilization of streaming media.

While examples of streaming media technologies, such as typical techniques for accessing RealPlayer streaming media files, are described above, it should be recognized that the present invention is not limited to a specific type of streaming media technology. Further, while examples of streaming audio and streaming video files are described above, the present invention is not limited solely to such types of streaming media, but rather any type of streaming file is intended to be within the scope of the present invention.

There are different types of media servers available in the art. Examples of known media servers include RealNetwork™ Server 8, Windows™ Media Server, QuickTime™ Streaming Server available from Apple Computer, Inc. In servicing client-requests, some media servers, such as early versions of the Windows™ Media Server, completely bypass memory. However, many media servers, such as RealNetwork™ Server 8 use the system's memory in servicing client requests. For instance, many media servers use the native operating system file buffer cache support for buffering recently accessed portions of files being served to clients. Files available in memory can generally be accessed more efficiently than those stored to disk. If the file is not available in memory, then the media server accesses its disk to retrieve the file. As the file (or currently needed portion thereof) is retrieved from disk, it is stored to memory and served to the requesting client. In this manner, many media servers use the system's memory (e.g., native operating system file buffer cache support) for buffering recently accessed portions of files being served to clients to enable later accesses to those portions of files that are stored to memory to be served more efficiently by the media server. Embodiments of the present invention are useful for modeling the memory of such media servers that make use of memory for buffering recently accessed portions of files being served to clients, wherein such modeling may be used for implementing an admission control system for managing the admission of newly received requests for the media server.

Further, oftentimes a single server (or server cluster), such as server 101 in FIG. 1, may be used for providing hosting services for a plurality of different customers (or entities). For instance, as described above, media content hosting is an increasingly common practice, in which providers who have a large amount of resources offer to store and provide access to media files from institutions, companies and individuals who are looking for a cost efficient, "no hassle" solution. In general, a shared media hosting service creates a set of virtual servers on the same server (or server cluster). This supports the illusion that each hosting service has its own media server, when in reality, multiple "logical hosts" may share one physical host. For example, server 101 may be used to host services for a plurality of different entities. For instance, streaming media file A may be a file hosted by server 101 for a first entity, while streaming media files B and C are files hosted by server 101 for a second entity. In effect, a plurality of hosting services may be implemented on such server 101, wherein the plurality of hosting services share the resources of server 101, such as its memory, disk, etc.

Thus, a plurality of logical hosts may be implemented on server 101 and the physical resources of server 101 may be shared by the plurality of logical hosts. In such a shared media server implementation, issues arise as to how to manage the resources of server 101 in order to support the hosting services for each entity (e.g., in order to support each logical hosting service implemented by server 101) in a desired manner. If access to the server's resources by the plurality of hosting services goes unmanaged, the hosting services may negatively impact each other. For instance, if unmanaged, one hosting service may receive a number of concurrent client requests and in order to service those requests may consume substantially all of the media server's resources such that the media server is unable to support concurrent (or overlapping) requests received for another hosting service. As a result, if access to the shared resources is unmanaged, a first hosting service may dominate the resources leaving insufficient resources for the other hosting services to utilize in servicing their requests.

Thus, it may be desirable to manage the server's shared resources in a manner that ensures each hosting service has allocated an equal amount (or other desired allocation) of resource usage. As another example, service level agreements (SLAs) may be entered into with the entities whose services are being hosted by server 101, and such SLAs may dictate the level of service to be provided by the shared media server for each hosting service. Accordingly, it may be desirable to manage the server's shared resources in a manner that ensures each hosting service has allocated sufficient resource usage for satisfying the level of service provided in its respective SLA.

Co-pending U.S. patent application Ser. No. 10/306,279 filed Nov. 27, 2002 entitled "SYSTEM AND METHOD FOR MEASURING THE CAPACITY OF A STREAMING MEDIA SERVER," the disclosure of which is hereby incorporated herein by reference, discloses a set of benchmarks for measuring the basic capacities of streaming media systems. The benchmarks allow one to derive the scaling rules of server capacity for delivering media files which are: i) encoded at different bit rates, and ii) streamed from memory versus disk. As U.S. patent application Ser. No. 10/306,279 titled "SYSTEM AND METHOD FOR MEASURING THE CAPACITY OF A STREAMING MEDIA SERVER" further describes, a "cost" function can be derived from the set of basic benchmark measurements. This cost function may provide a single value to reflect the combined resource requirement such as CPU, bandwidth, and memory necessary to support a particular media stream depending on the stream bit rate and type of access (e.g., memory file access or disk file access).

Traditional media server solutions do not have a built-in admission control policy (for controlling the admission of new client requests to be serviced by the media server) that can prevent server overload and guarantee a desired quality of service. Instead, traditional media servers continue to admit new client requests upon their receipt by the media server and provide degraded quality of service by sharing the available server resources among the admitted streams (even when the media server's resources are overloaded and unable to support the admitted streams). Further, traditional shared media server solutions fail to include an admission control strategy to ensure a desired allocation of resource usage by a plurality of hosts implemented on the shared media server. Rather, one host may dominate usage of the shared resources, thus negatively impacting the quality of service (QoS) provided by the other hosts.

Certain admission control strategies have been proposed in the technical literature that propose using the maximum bandwidth a server is capable of delivering as an indicator for admission control. However, as described in U.S. patent application Ser. No. 10/306,279 titled "SYSTEM AND METHOD FOR MEASURING THE CAPACITY OF A STREAMING MEDIA SERVER", the amount of bandwidth a server is capable of delivering is variable and depends on the encoding bit rates of current streams in progress. Another possible approach for admission control strategy is based on a pessimistic model, where a new client request is admitted only if a server has enough resources to deliver this request from the disk. However, media server performance may be 3-5 times higher (depending on disk and file system) when media streams are delivered from memory versus from disk. Thus, while the pessimistic admission control strategy provides hard guarantees against server overload, it may lead to significant over-provisioning and inefficient resource usage. Thus, this strategy may indeed be too "pessimistic" because it has been observed that typical media workload has a high degree of reference locality (i.e., a high percent of requests often are accessing a small subset of media files) and exhibit a strong sharing pattern (i.e., accesses to the same file come in "bursts"). Intuitively, in such a workload, most of the accesses to popular files may be served from memory, rather than from disk.

Therefore, in order to provide an efficient admission control mechanism for a streaming media server, it is desirable to be capable of estimating the cost of a new request acceptance, and hence to be able to determine which segments of the requested file are stored in memory. More specifically, by determining which segments of a requested file are stored in memory, an estimate of consumption of memory versus disk resources of the media server in serving the requested file can be estimated. Accordingly, certain embodiments of the present invention enable a shared media server's current memory state to be modeled to enable, for example, a determination of whether a newly received request will initially be serviced by memory. That is, whether the received request will have an immediate impact on memory resources or disk resources of the media server can be efficiently determined from the modeled memory state. More particularly, the modeled memory state may identify the segments of files stored to the media server's memory (i.e., the content of the memory), and thus from such modeled memory state a determination can be made whether a prefix of a requested file is available in memory. If the prefix of a requested file is in memory then such request, if admitted for service by the media server, will have an immediate impact on the memory resources, whereas if the prefix of the requested file is not in memory then such request, if admitted for service by the media server, will have an immediate impact on disk resources. Thus, as described further below, a memory state model may be used to implement a cost-aware admission control strategy for managing admission of requests to each of a plurality of hosting services implemented on a shared streaming media server.

A. Segment-Based Access Model

To efficiently determine a memory state of a shared media server, certain embodiments of the present invention utilize a segment-based model (or data structure) of streaming media files, as described further below. That is, an embodiment of the present invention that uses a segment-based model representing streaming media file accesses is described further below, wherein for each client request r the following notations are used:

file(r)—the media file requested by r;

duration(r)—the duration of file (r) in seconds;

bitrate (r)—the encoding bit rate of the media file requested by r (in describing this embodiment, it is assumed that files are encoded at constant bit rates);

$t^{start}$ (r)—the time when a stream corresponding to request r starts (once r is accepted by the media server);

$t^{end}$ (r)—the time when a stream initiated by request r is terminated (in describing this embodiment, non-interactive client sessions are assumed, i.e., duration(r)$\leq t^{end}$(r)–$t^{start}$(r)).

As an example of the real-time nature of streaming media, let request r be a sequential access to streaming media file f from the beginning of the file. For simplicity, let it be a disk access. Then, after 10 seconds of access r, the content, transferred by a server, corresponds to the initial 10 seconds of the file f The duration of a transferred file prefix defines the number of bytes transferred from disk to memory and further to the client: in this example, it is assumed to be 10 seconds× bitRate(r). Moreover, the real-time nature of file access in streaming media defines the relative time ordering of streamed file segments in memory. This means that the time elapsed from the beginning of the file (e.g., 0 seconds is used here to denote the file beginning) can be used to describe both: 1) the streamed file segment and 2) the relative timestamps of this file segment in memory.

Figure 2:
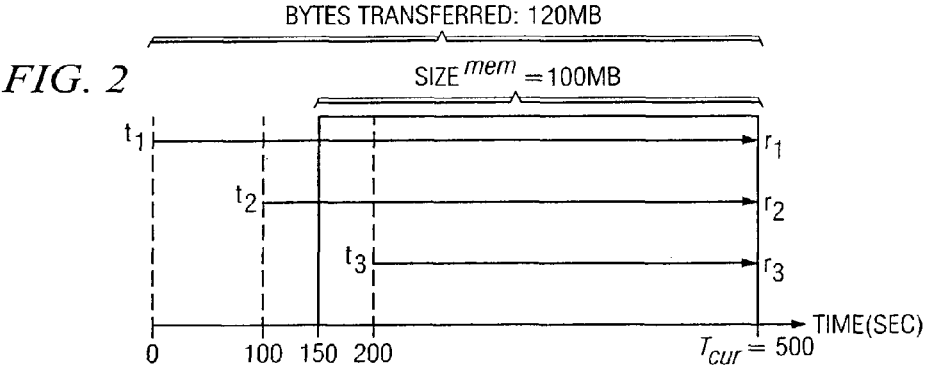
FIG. 2 shows an example of how file segments are stored to memory when concurrent (or overlapping) accesses are made to different media files, given the real-time nature of such media files.

To clarify this point further, FIG. 2 shows an example of how file segments are stored to memory when concurrent (or overlapping) accesses are made to different media files, given the above-described real-time nature of such media files. For the example of FIG. 2, consider a media server that has a 100 MB memory, and the media server has media files $f_1, f_2,$ and $f_3$ stored thereto, wherein each of such media files $f_1, f_2,$ and $f_3$ are 600 seconds (10 minutes) long and encoded at 100 KB/s. Let us consider the following sequence of request arrivals as shown in FIG. 2:

request $r_1$ for file $f_1$ arrives at time $t_1$=0 seconds (sec);

request $r_2$ for file $f_2$ arrives at time $t_2$=100 sec; and request $r_3$ for file $f_3$ arrives at time $t_3$=200 sec It should be recognized that the time reference shown in FIG. 2 is a "global" time reference across all of the received requests. For instance, request $r_1$ for file $f_1$ arrives at time $t_1$=0 sec, and request $r_2$ for file $f_2$ arrives 100 seconds later at time $t_2$=100 sec As described further below, the file segments may be designated by their "local" time references. For instance, at time t=150 see file $f_1$, which began being accessed at time $t_1$=0 sec, is 150 seconds into its stream (which is 600 seconds in duration), and file $f_2$, which began being accessed at time $t_2$=100 sec, is 50 seconds into its stream (which is also 600 seconds in duration).

Let us evaluate the media server's memory state at time point $T_{cur}$=500 sec, shown in FIG. 2. While the overall number of bytes transferred by the three requests is 120 MB, the memory of this example media server can hold only 100 MB of latest (most recent) portions of transferred files which are represented by the following file segments:

a) a segment of file $f_1$ between 150 seconds and 500 seconds of its duration. The denotation <150,500>(150) is used herein to describe this segment, where numbers in "<>" describe the beginning and the end of a file segment, and a number in "( )" defines a relative timestamp (or "global timestamp") in memory corresponding to the beginning of the file segment. That is, the numbers in "<>" describe the "local" timestamp of a file segment by identifying the beginning and the end times of the file segment, and the number in "( )" defines a "global" timestamp for a time reference that is consistent across all requests;

b) a segment of the file $f_2$: <50,400>(150), i.e., the segment of file $f_2$ from 50 seconds to 400 seconds of its duration with the access of such segment starting at the global timestamp of 150 seconds; and c) a segment of the file $f_3$: <0,300>(200), i.e., the segment of file $f_3$ from 0 seconds to 300 seconds of its duration with the access of such segment starting at the global timestamp of 200 seconds.

This new abstraction provides a close approximation of file segments stored in memory and their relative time ordering (timestamps) in memory. That is, for the example of FIG. 2, at time $T_{cur}$=500 sec, the following segments are stored to the media server's memory: file $f_1$<150,500>(150), file $f_2$<50, 400>(150), and file $f_3$<0,300>(200).

The above example of FIG. 2 provides an example of modeling a media server's memory for concurrent accesses (or "overlapping" accesses—i.e., one access beginning before another access ends) to different files $f_1$, $f_2$, and $f_3$. In many instances, the overlapping accesses may be for the same file f. If there are multiple concurrent (or overlapping) accesses to the same file f, then requests with later arrival time might find the corresponding file segments being already in memory. Thus, operations for computing the unique segments of file f with the most recent timestamps which correspond to a sequence of accesses to f may be utilized in an embodiment of the present invention, as described further below.

In accordance with an embodiment of the present invention, a file segment transferred by request $r^f$ during time interval [T,T'] is defined as follows:

$$\text{segm}(r^f, T, T') = \langle x, y \rangle (\hat{T})$$

where $$x = \max\{T, t^{start}(r^f)\} - t^{start}(r^f),$$

$$y = \min\{t^{end}(r^f), T'\} - t^{start}(r^f), \text{ and}$$

$$\hat{T} = \max\{T, t^{start}(r^f)\}.$$

In computation of a current memory state of a shared media server in accordance with an embodiment of the present invention, the "unique" file segments currently present in memory are computed. This means that in a case of multiple requests to the same file, the accesses and the corresponding file segments with the latest access time are identified in a manner that avoids repetitively counting of the same bytes accessed by different requests at different time points. Thus, file segments of a model (or data structure) are referred to herein as being "unique" because the corresponding portion of the file of each segment is included in only one of the segments of the model. That is, each segment of the access model represents a unique portion of a file, and as described further below, each segment has associated therewith a corresponding global timestamp that identifies the time at which such segment was last accessed.

As a simple example, suppose a first request $r_1$ is received at global time t=0 see for a file f, which is 100 sec in length. Assuming no other requests are made in the interim, at global time 100 sec the entire file f has been served to the requesting client and saved to the media server's memory. Accordingly, a segment of the memory may be denoted as f <0,100>(0), which identifies that segment <0,100> of file f(the entire file f in this example) is stored to memory having a latest access time of global timestamp t=0 sec. Assume now that at global time t=150 sec a second request $r_2$ for file f is received by the media server. Because file f is available in memory, it can be served to the client from memory. However, the memory segment for file f should now be updated to reflect that it has been more recently accessed. Thus, the data structure modeling such segment may be updated to provide: f:<0,100>(150), which identifies that segment <0,100> of file f (the entire file f in this example) is stored to memory having a latest access time of global timestamp t=150 sec. By updating the global timestamp at which the file segment was most recently accessed, a proper determination may be made as to the file segments (or portions thereof) that may be evicted from the media server's memory in accordance with the memory management scheme implemented for the server, such as a Least Recently Used (LRU) scheme, as described further below.

Figure 3:
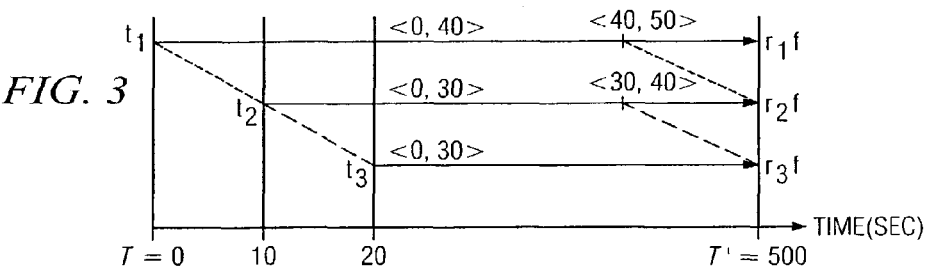
FIG. 3 shows an example in which concurrent (or overlapping) accesses are made to the same file f.

To explain this situation in more detail, attention is now directed to FIG. 3, which graphically depicts an example in which concurrent accesses are made to the same file f In the example of FIG. 3, let $r_1^f$, $r_2^f$, $r_3^f$ be a sequence of requests accessing the same file f in the following arrival order: $t^{start}(r_1^f)$=0 sec, $t^{start}(r_2^f)$=10sec, and $t^{start}(r_3^f)$=20 sec. That is, request $r_1^f$ is received at global time T=0 sec, request $r_2^f$ is received at global time T=10 sec, and request $r_3^f$ is received at global time T=20 sec.

By the time T'=50 sec, the first request $r_1^f$ has transferred segment <0,50>(0) of file f, and the initial part of this segment <0,40>(0) is again accessed and transferred at a later time by the second request $r_2^f$. Thus, segment <40,50>(40) is the only "unique" segment of file f accessed by $r_1^f$ most recently. That is, segment <40,50>(40) is the only segment of file f that has been accessed most recently by request $r_1^f$ because other segments of file f accessed by request $r_1^f$ have been more recently accessed by other requests, such as request $r_2^f$.

Similarly, segment <30,40>(40) represents the only unique segment of file f that was accessed most recently by $r_2^f$. More specifically, by the time T'=50 sec, request $r_2^f$ has transferred segment <0,40>(10) of file f, and the initial part of this segment <0,30>(10) is again accessed and transferred at a later time by the third request $r_3^f$. Thus, segment <30,40>(40) is the only unique segment of file f accessed by $r_2^f$ most recently. That is, segment <30,40>(40) is the only segment of file f that has been accessed most recently by request $r_2^f$ because other segments of file f accessed by request $r_2^f$ have been more recently accessed by other requests, such as request $r_3^f$.

Finally, the latest request $r_3^f$ is accountable for the most recent access to the initial segment <0,30>(20) of file f. Thus overall, the unique segments of file f with the most recent timestamps in the global time reference [0, 50]sec interval are the following:

$$\text{segm}(f, 0, 50) = \{<0,30>(20), <30,40>(40), <40,50>(40)\}.$$

In the above denotation, segm(f, 0, 50) identifies that the segment under evaluation is the segment for file f as accessed during the global time reference of 0 sec to 50 sec. In the example of FIG. 3, the resulting segments of file f for this evaluation are {<0,30>(20), <30,40>(40), <40,50>(40)}, wherein the segment <0,30>(20) corresponds to the portion of file f most recently accessed by request $r_3^f$, the segment <30,40>(40) corresponds to portion of filed most recently accessed by request $r_2^f$, and the segment <40,50>(40) corresponds to portion of file f most recently accessed by request $r_1^f$.

To determine the unique, most recent segments of file f accessed by subsequent requests $r_{i_1}^f$ and $r_{i_2}^f$ in [T, T'] time interval, a new operation called "segments subtraction" and denoted as "\" is introduced herein. Let $r_{i_1}^f$ and $r_{i_2}^f$ be two subsequent requests accessing the same file f such that $t^{start}(r_{i_1}^f) \leq t^{start}(r_{i_2}^f)$, i.e. $r_{i_2}^f$ is more recent access than $r_{i_1}^f$. Let $segm_{i_1} = segm(r_{i_1}^f, T, T') = <x_{i_1}, y_{i_1}>(T_{i_1})$ and $segm_{i_2} = segm(r_{i_2}^f, T, T') = <x_{i_2}, y_{i_2}>(T_{i_2})$. Then $$segm_{i_1} \backslash segm_{i_2} = \begin{cases} \langle x_{i_1}, y_{i_1} \rangle (T_{i_1}) & \text{if } y_{i_2} \leq x_{i_1} \\ \langle y_{i_2}, y_{i_1} \rangle (T'_{i_1}) & \text{otherwise} \end{cases} \quad (1)$$

where $T'_{i_1} = T_{i_1} + (y_{i_2} - x_{i_2})$.

Intuitively, operation ($segm_{i_1} \backslash segm_{i_2}$) tries to define a part of older segment $segm_{i_1}$, which does not coincide with any part of more recent segment $segm_{i_2}$. Accordingly, this operation results in determination of "unique" file segments that have been accessed.

Now, let $r_1^f, r_2^f, \ldots, r_n^f$ be a sequence of requests accessing the same file f during [T,T'] interval, where $t^{start}(r_1^f) \leq t^{start}(r_2^f) \leq \ldots \leq t^{start}(r_n^f)$, i.e. $r_1^f$ is the oldest access and $r_n^f$ is the most recent access to file f in [T, T'] interval. It is desirable to compute the unique segments of file f with the most recent timestamps which correspond to requests $r_1^f, r_2^f, \ldots r_n^f$ during time interval [T, T']. The general formula to compute such file segments is defined in the following way:

$$segm(f, T, T') = \bigcup_{i=1}^{n} \left( segm(r_i^f, T, T') \backslash segm(r_{i+1}^f, T, T') \right) \quad (2)$$

where $segm(r_{n+1}^f, T, T') = <0,0>(0)$, i.e. a "zero" size segment. If $r^f$ is the only request accessing file f during [T, T'] interval then $segm(f, T, T') = segm(r^f, T, T')$.

As a further illustrative example, let $segm(f,T,T') = \{<x_1, y_1>(T_1), \ldots, <x_n, y_n>(T_n)\}$. Note that the set of segments $segm(f,T,T')$ can be ordered in two different ways: 1) according to file f's structure and/or 2) according to their timestamps, as described further hereafter. The first ordering technique is referred to as "file structure ordering of the segments," in which the segments are ordered according to file f's structure. In an embodiment of the present invention, the segments are ordered according to file f's structure if for any two consecutive segments $<x_i, y_i>(T_i)$ and $x_{i+1}, y_{i+1}>(T_{i+1})$ the following condition holds: $y_i \leq x_{i+1}, 1 \leq i \leq n-1$. This representation conveniently reflects which segments of file f were accessed during the time interval [T,T']. To distinguish this file structure ordering, the denotation $segm_{order}^{file}(f,T,T')$ is used herein.

The second ordering technique is referred to as "timestamp ordering of segments" (or "memory ordering of segments"), in which the segments are ordered according to their global timestamps. In an embodiment of the present invention, the segments are ordered according to their global timestamps if for any two consecutive segments $<x_i, y_i>(T_i)$ and $<x_{i+1}, y_{i+1}>(T_{i+1})$ the following condition holds: $T_i \leq T_{i+1}, 1 \leq i \leq n-1$. This representation conveniently reflects the time ordering of accessed file segments during the time interval [T,T']. To distinguish time ordering, the denotation $segm_{order}^{time}(f,T,T')$ is used herein.

The above-described computations may be used to create a segment-based access model for the streaming media files, which can be used to efficiently determine the file segments stored in memory (i.e., to compute a current memory state of the media server). More specifically, the above-described computations can be used to create data structures representing segments of a file accessed by one or more requests during a given time interval of interest, and such segment-based model of the file accesses can be used to efficiently determine the current memory state of a media server. An example technique for determining the "unique" segments of a file that were accessed during a time interval of interest in accordance with an embodiment of the present invention is further described in concurrently filed and commonly assigned U.S. patent application Ser. No. 10/601992 titled "COST-AWARE ADMISSION CONTROL FOR STREAMING MEDIA SERVER", the disclosure of which is hereby incorporated herein by reference.

B. Computing Memory State for a Media Server

As described above, data structures may be created that represent the unique, most recently accessed segments of a file for accesses occurring during a time interval of interest. In accordance with an embodiment of the present invention, such data structures may be used to compute (or model) the current memory state of a shared media server. As an example, suppose a shared media server has files $f_1, f_2, f_3, f_4$, and $f_5$ stored thereto, which are each encoded at the same bit rate (e.g., 56 Kb/s). For instance, one or more of files $f_1, f_2, f_3, f_4$, and $f_5$ may be stored to the shared media server as part of a first hosting service implemented thereon, and others of such files $f_1, f_2, f_3, f_4$, and $f_5$ may be stored to the shared media server as part of a second hosting service implemented thereon. Further suppose that the files have the following durations: $f_1$=45 sec duration, $f_2$=200 sec duration, $f_3$=360 sec duration, $f_4$=240 sec duration, and $f_5$=100 sec duration. The above-described modeling technique may be performed to create a segment-based access model for each file. For instance, a segment-based access model may be created for each of files $f_1$-$f_5$ based on accesses to those files during the time interval [0,5000] (i.e., from global timestamp 0 sec through global timestamp 5000 sec). The resulting segment-based access models that may be created for each of the files in this example are as follows:

$segm(f_1, 0, 5000) = \{<0,40>(4960), <40,45>(4995)\};$ $segm(f_2, 0, 5000) = \{<0,200>(270)\};$ $segm(f_3, 0, 5000) = \{<0,360>(4500)\};$ $segm(f_4, 0, 5000) = \{<0,240>(3560)\};$ and $segm(f_5, 0, 5000) = \{<0,100>(1025)\}$ Thus, a segment-based access model (or data structure) is constructed for each of the files $f_1$-$f_5$ that identifies unique, most recently accessed segments of each file during the time interval [0,5000]. As can be seen in the above segment-based access model for file $f_1$, its segment <0,40> was last accessed starting at time 4960 sec and its segment <40,45> was last accessed starting at time 4995 sec. From the segment-based access model of file $f_2$, it can be seen that its entire file (i.e., segment <0,200>) was last accessed starting at time 270 sec. From the segment-based access model of file $f_3$, it can be seen that its entire file (i.e., segment <0,360> was last accessed starting at time 4500 sec. From the segment-based access model of file $f_4$, it can be seen that its entire file (i.e., segment <0,240>) was last accessed starting at time 3560 sec. Finally, from the segment-based memory model of file $f_5$, it can be seen that its entire file (i.e., segment <0,100>) was last accessed starting at time 1025 sec.

Suppose now that the media server's memory has a size that is capable of storing up to 400 seconds of the streaming media files (i.e., memory size=400 seconds×56Kb/s=22400 Kb in this example), the above segment-based access models may be useful in determining the data stored to the media server's memory at time t=5000 sec. For simplicity, this example assumes that all of the files have the same encoding bit rate. Of course, in many streaming media applications the streaming media files may have different encoding bit rates, and thus the amount memory consumed by an access to any such file may be determined as a function of the duration of the file access and the file's encoding bit rate (e.g., memory consumed for an access=file access duration×file encoding bit rate). In this example, all of files $f_1$-$f_5$ cannot be stored in full to the media server's memory because the sum of the bytes accessed for such files $f_1$-$f_5$ (i.e., 945 sec×56 Kb/s encoding rate=52920 Kb in this example) exceeds the total bytes capable of being stored to the media server's memory (i.e., 22400 Kb in this example). Thus, it may be desirable to know the content of the media server's memory at time t=5000 (i.e., it may be desirable to know the portions of files $f_1$-$f_5$ that are stored to the media server's memory at time t=5000).

With knowledge regarding the media server's memory management scheme, the above segment-based access model of files $f_1$-$f_5$ may be used to determine the state of the media server's memory at time t=5000. For instance, typically a media server's memory is managed in accordance with an LRU scheme, wherein the most recently accessed segments of files are stored to memory and the oldest (or least recently) accessed segments of files are evicted when needed to make room in memory for storing more recently accessed files. Assuming such an LRU scheme is followed for the above example, the state of the media server's memory at time t=5000 can be determined using the segment-based access models of files $f_1$-$f_5$. For instance, from the above segment-based access models of files $f_1$-$f_5$, it can be seen that portions <40,45> and <0,40> of file $f_1$ were most recently accessed, i.e., at times 4995 sec and 4960 sec respectively. Thus, file $f_1$ having a duration of 45 sec is included in the media server's memory at time 5000 sec in this example.

The next most recent file segment accessed in the above example was the entire file $f_3$ (i.e., segment <0,360>) which was accessed at time 4500 sec. File $f_3$ has a total duration of 360 sec, while the duration of file $f_1$ is 45 sec. Thus, the sum duration of files $f_3$ and $f_1$ is 405 sec. Because each of the files are assumed in this example to have an encoding bit rate of 56 Kb/s, the entire 405 sec duration of files $f_1$ and $f_3$ exceeds the media server's memory. Thus, the entire 300 sec duration of file segment <0,300> of file $f_3$ cannot be stored to the media server's memory, but rather only the most recent 295 sec of such segment is stored to the media server's memory. The remainder of such segment, as well as the least recently accessed segments of files $f_2$,$f_4$, and $f_5$, would have been evicted from memory in order to store the more recent accesses in accordance with the LRU management scheme. Thus, the portion of segment <0,300> of file $f_3$ that would remain in memory is <5,300>(4505)—it should be noted that the timestamp for the access of this segment is 4505 sec. Thus, the resulting contents of the media server's memory in the above example would be as follows:

memory state={$f_1$<40,45>(4995),$f_1$<0,40>(4960), $f_3$<5,30>(4505)}.

Computing the current memory state may be described as follows: let $Size^{mem}$ be the size of a media server's memory in bytes and let $r_1(t_1),r_2(t_2), \ldots ,r_k(t_k)$ be a recorded sequence of requests to the media server; given the current time T, some past time $T^{mem}$ is computed such that the sum of the bytes stored in memory between $T^{mem}$ and T is equal to $Size^{mem}$. In this manner, the files' segments streamed by the media server between times $T^{mem}$ and T will be in the media server's memory. By modeling the current state of the media server's memory, an intelligent determination of the server's resources that will be utilized to service a newly received client request can be made. That is, an intelligent determination can be made as to whether a newly received client request can be serviced from the media server's memory or whether the received client request will require access to the media server's disk. An example of computing a current memory state of a media server in accordance with an embodiment of the present invention is described further below in conjunction with FIGS. 4-5.

Figure 4:
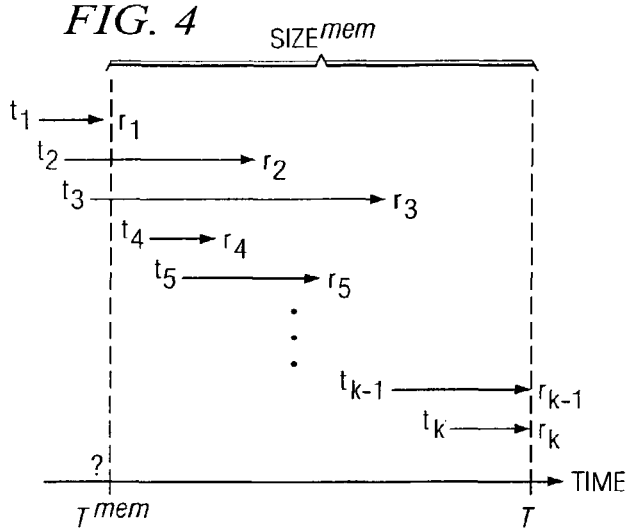
FIG. 4 shows an example of requests for file accesses that are made to a media server during the interval of time ti through time T, wherein the interval from time $T^{mem}$ through time T can be determined that comprises the segments of accessed files that are currently stored to the media server's memory, which has size $Size^{mem}$.

Turning to FIG. 4, an example of requests for file accesses that are made to a media server during the interval of time $t_1$ through time T is shown, wherein the interval from time $T^{mem}$ through time T can be determined that comprises the segments of accessed files that are currently stored to the media server's memory, which has size $Size^{mem}$. More specifically, accesses $r_1, r_2, r_{k-1}, r_k$ are made during the time interval from time $t_1$ through the current time T. As shown in the example of FIG. 4, the total size of the segments accessed is greater than the total size $Size^{mem}$ of the media server's memory. Thus, depending on the type of memory management scheme implemented for the memory, some of the accessed segments are evicted from the memory. That is, not all of the accessed segments can be stored to memory because the segments' total size is greater than the size $Size^{mem}$ of memory. Typically, a LRU scheme is implemented for a media server, wherein the most recently accessed segments are stored to memory and the oldest (or least recently accessed) segments are evicted when necessary to make room for more recently accessed segments to be stored in memory. To determine the current contents of memory, the time interval from time $T^{mem}$ to the current time T in which unique file segments that have a size totaling size $Size^{mem}$ is determined.

Because, as described above, the function $segm(f,T^{mem},T)$ represents the unique segments of file f accessed in $[T^{mem},T]$ interval, the total amount of unique bytes of file f accessed and stored in, memory between $[T^{mem},T]$ interval can be computed, and such total amount is denoted herein as Unique-Bytes$(f,T^{mem},T)$.

Figure 5:
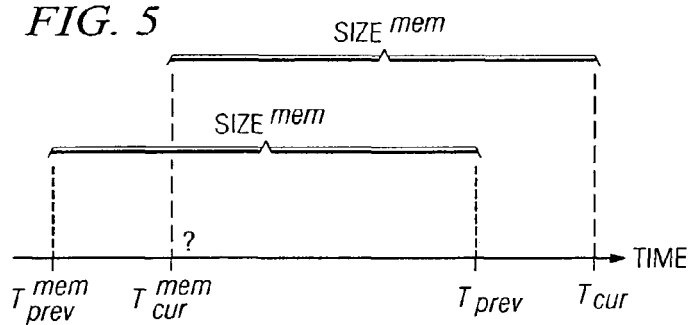
FIG. 5 shows an example of determining a time interval that includes file accesses such that the sum of unique bytes accessed is equal to the size of the media server's memory.

To determine a media server's memory state in an efficient way, an embodiment of the present invention utilizes an induction-based algorithm for computing the memory state at any given time. As an example, let $T_{cur}$ be a current time corresponding to a new request $r_{new}^f$ arrival, wherein an admission controller may be implemented to decide whether to accept or reject request $r_{new}^f$ for processing. Further, let $T_{prev}$ denote the time of the previous arrival event, and let $T_{prev}^{mem}$ be a previously computed time such that the sum of bytes stored in memory between $T_{prev}^{mem}$ and $T_{prev}$ is equal to $Size^{mem}$, as shown in FIG. 5. It should be understood that while the duration from $T_{prev}^{mem}$ to $T_{prev}$ is shown in FIG. 5 as being the same as the duration from $T_{cur}^{mem}$ to $T_{cur}$, this will not always be the case. Indeed, often the duration of interval $[T_{prev}^{mem},T_{prev}]$ will be different than the interval $[T_{cur}^{mem}, T_{cur}]$. For instance, if the files accessed during each time interval are encoded at different rates, the durations from $T_{prev}^{mem}$ to $T_{prev}$ and from $T_{cur}^{mem}$ to $T_{cur}$ in which the amount of unique bytes accessed in each time segment is equal to Size$^{mem}$ will not be the same. It should be recalled that to determine the amount of memory consumed by requests (i.e., to identify whether the requests fill the Size$^{mem}$) each file request may be computed as a function of the file's encoding rate and duration of its access (e.g., encoding rate of file× duration of access of the file).

Upon receipt of $r_{new}^f$ at time point $T_{cur}$, the following are computed:

a) an updated time $T_{cur}^{mem}$ such that the sum of bytes stored in memory between $T_{cur}^{mem}$ and $T_{cur}$ is equal to Size$^{mem}$; and b) an updated information on file segments stored in memory in order to determine the access type of new request $r_{new}^f$ (e.g., whether the requested file will begin being served from memory or from disk if request $r_{new}^f$ is admitted to the media server).

For illustration, let Files$(T_{prev})=\{f_{i_1},\ldots,f_{i_k}\}$ be a set of files accessed during $[T_{prev}^{mem}, T_{prev}]$ interval, and let Reqs$(T_{prev})$ be a sequence of requests $r_1, r_2, \ldots, r_n$ accessing files Files $(T_{prev})$ during $[T_{prev}^{mem}, T_{prev}]$ interval. To compute the current memory state in time $T^{cur}$ in accordance with an embodiment of the present invention, the following operations are performed:

1) Using Formula (2) from above, for each file f∈Files $(T_{prev})$, all of the corresponding requests Reqs$^f(T_{prev})=\{r_1^f, r_2^f, \ldots r_n^f | r_1^f \in \text{Reqs}(T_{prev})\}$ are considered, and all of the unique segments of f which were accessed by requests from Reqs$^f(T_{prev})$ in $[T_{prev}^{mem}, T_{cur}]$ interval are determined. Using file structure ordering of segments, the information about the files and their unique segments are stored in a data structure called FileTable $(T_{prev}^{mem}, T_{cur})$:

$f_{i_1}$:segm$_{order}^{file}(f_{i_1}, T_{prev}^{mem}, T_{cur})$ $f_{i_k}$:segm$_{order}^{file}(f_{i_k}, T_{prev}^{mem}, T_{cur})$.

2) Using timestamp ordering of segments, the information about the files and their unique segments are also stored in a data structure called TimeFileTable$(T_{prev}^{mem}, T_{cur})$:

$f_{i_1}$:segm$_{order}^{time}(f_{i_1}, T_{prev}^{mem}, T_{cur})$ $f_{i_k}$:segm$_{order}^{time}(f_{i_k}, T_{prev}^{mem}, T_{cur})$.

3) At this point, all of the necessary information is available to compute an updated time $T_{prev}^{mem}$ such that the sum of unique bytes transferred during the period $[T_{prev}^{mem}, T_{cur}]$ is equal to Size$^{mem}$.

Using FileTable $(T_{prev}^{mem}, T_{cur})$, the total amount of unique bytes accessed during this time interval is computed as:

$$\text{UniqueBytes}(T_{prev}^{mem}, T_{cur}) = \sum_{f \in F_{prev}} \text{UniqueBytes}(f, T_{prev}^{mem}, T_{cur}).$$

The difference UniqueBytes$(T_{prev}^{mem}, T_{cur})$–Size$^{mem}$ defines by "how much" $T_{prev}^{mem}$ should be advanced to a new time point $T_{cur}^{mem}$. Using TimeFileTable$(T_{prev}^{mem}, T_{cur})$ which provides the information about file segments according to their time ordering, $T_{cur}^{mem}$ can be determined.

After that, the corresponding datastructures TimeFileTable and FileTable are updated for time interval $[T_{cur}^{mem}, T_{cur}]$ to contain only file segments starting at time $T_{cur}^{mem}$ and later. Data structures Files$(T_{cur})$ and Reqs$(T_{cur})$ are also updated as follows: a) Files$(T_{cur})$ has only files with segments accessed at time $T_{cur}^{mem}$ and later, and b) Reqs$(T_{cur})$ has only requests which contribute to a set of unique file segments in $[T_{cur}^{mem}, T_{cur}]$ interval.

From the determined memory state, a determination can be made as to whether a file f (or its initial prefix) requested by $r_{new}^f$ is residing in memory or not, and thus whether the request $r_{new}^f$ will have a type of access to memory or disk correspondingly. An example technique for determining a memory state of a media server and for determining from the memory state an access type of a request is further described in concurrently filed and commonly assigned U.S. patent application Ser. No. 10/601992 titled "COST-AWARE ADMISSION CONTROL FOR STREAMING MEDIA SERVER", the disclosure of which has been incorporated herein by reference.

C. Cost-aware Admission Control for a Shared Media Server

Embodiments of the present invention provide a cost-aware admission control strategy for shared streaming media servers for managing the amount of usage of the shared resources by each of the hosting services implemented on the shared media server to ensure that each hosting service has a desired amount of resources available for its use. In order to assign a cost to a newly received request for a hosting service, a determination is made as to whether the new request will be streaming data from memory (i.e., will have a cost of memory access) or will be accessing data from disk (i.e., will have a cost of disk access). It should be understood that that assigning a "memory access" cost to a newly received request in certain embodiments does not assume or require that the whole file requested resides in memory. For instance, as described above with the example of FIG. 3, when there is a sequence of accesses to the same file, the first access may read the file from disk (to memory) while all of the subsequent requests access the corresponding file prefix from memory.

A satisfactory technique for measuring the capacity of a media server under realistic workloads is not available in the prior art. A standard commercial stress test used by most media server vendors measures a maximum number of concurrent streams deliverable by the server when all of the clients are accessing the same file encoded at a certain fixed bit rate, e.g. 500 Kb/s. That is, in standard commercial stress tests, vendors use a particular streaming media file that is encoded for transmission at a particular bit rate for measuring the maximum number of concurrent streams that clients can retrieve of this file.

The standard commercial stress test approach is unsatisfactory for several reasons. First, media files are often encoded for transmission at different bit rates. For instance, clients in a given population have different speed connections to the Internet (or other client-server network). For example, in a realistic population of clients, different clients typically comprise various different speed connections, such as dial-up modem connections (e.g., using a 28 or 56 kilobits analog modem), Integrated Services Digital Network (ISDN) connections, cable modem connections, Digital Subscriber Line (DSL) connections, and even higher-bandwidth connections, as examples. Accordingly, different clients may have different speed connections to the Internet varying, for example, from 28 kilobits (Kb) per second to 500 Kb (or more) per second, thus resulting in requirements for different bit rate encodings at the streaming media files being accessed by the different clients. That is, a media server may comprise streaming media files encoded for transmission at various different bit rates (e.g., 28 Kb/s, 56 Kb/s, etc.), and may attempt to serve the most appropriate encoded file to a client based at least in part on the client's connection speed to the Internet.

Additionally, clients typically may access different media files from the server. That is, a media server commonly provides a plurality of different media files, various ones of which may be accessed concurrently by different clients. When concurrent accesses of a single file is measured, it leads to measurement of the server's capacity for serving a streaming media file from memory, which is often not actually the case. Accordingly, the standard commercial stress tests used by most media server vendors are unsatisfactory for obtaining an accurate measurement of the capacity of a media server for supporting a realistic workload in serving streaming media files to clients.

As mentioned above, a technique for measuring server capacity using a cost function is disclosed in co-pending U.S. patent application Ser. No. 10/306,279 filed Nov. 27,2002 entitled "SYSTEM AND METHOD FOR MEASURING THE CAPACITY OF A STREAMING MEDIA SERVER," the disclosure of which has been incorporated herein by reference. Also, a technique for measuring server capacity using a cost function is described by L. Cherkasova and L. Staley in "Building a Performance Model of Streaming Media Applications in Utility Data Center Environment", *Proc. of ACM/ IEEE Conference on Cluster Computing and the Grid (CCGrid)*, May, 2003 (hereinafter referred to as "the L. Cherkasova Paper"), the disclosure of which is hereby incorporated herein by reference. The above references introduce a basic benchmark that can be used to establish the scaling rules for server capacity when multiple media streams are encoded at different bit rates. For instance, a basic benchmark may be executed for each of various different encoding bit rates for files stored at a media server. An objective of the basic benchmark according to one embodiment is to define how many concurrent streams of the same bit rate can be supported by the media server without degrading the quality of any streams. In accordance with one embodiment, the basic benchmark comprises two types of benchmarks:

1) Single File Benchmark measuring a media server capacity when all the clients in the test are accessing the same file, and
2) Unique Files Benchmark measuring a media server capacity when each client in the test is accessing a different file.

Thus, a Single File Benchmark (SFB) may be executed for each of various different encoding bit rates for files stored at a media server under evaluation. The SFB measures the media server capacity when all of the clients in the test are accessing the same file. That is, the result of the SFB for a particular encoding bit rate defines the maximum number of concurrent streams of a single file encoded at that particular bit rate that the media server can support. Example techniques for executing SFBs for a media server are described further in co-pending U.S. patent application Ser. No. 10/306,279 entitled "SYSTEM AND METHOD FOR MEASURING THE CAPACITY OF A STREAMING MEDIA SERVER."

Similarly, a Unique File Benchmark (UFB) may be executed for each of various different encoding bit rates for files stored at a media server under evaluation. The UFB measures the media server capacity when all of the clients in the test are accessing different files. That is, the result of a UFB for a particular encoding bit rate defines the maximum number of concurrent streams, each of different files that are encoded at the particular bit rate, that the media server can support. Example techniques for executing UFBs for a media server are described further in co-pending U.S. patent application Ser. No. 10/306,279 entitled "SYSTEM AND METHOD FOR MEASURING THE CAPACITY OF A STREAMING MEDIA SERVER."

When all of a media server's clients are accessing a single file (as measured by the SFB), the media server is capable of serving the currently streamed bytes of the file from memory. However, when all of its clients are accessing a different file (as measured by the UFB), the media server serves each file from disk. Thus, the SFB is essentially a best-case scenario benchmark, whereas the UFB is essentially a worst-case scenario benchmark.

Using an experimental testbed with standard components available in a Utility Data Center environment and proposed set of basic benchmarks, the capacity and scaling rules of media server running RealServer 8.0 from RealNetworks was measured in the L. Cherkasova Paper. The measurement results reported in the L. Cherkasova Paper show that these scaling rules are non-trivial. For example, the difference between the highest and lowest bit rate of media streams used in those experiments was 18 times. However, the difference in maximum number of concurrent streams a server is capable of supporting for corresponding bit rates is only around 9 times for a Single File Benchmark, and 10 times for a Unique Files Benchmark. The media server performance is 2.5-3 times higher under the Single File Benchmark than under the Unique Files Benchmark. This quantifies the performance benefits for multimedia applications when media streams are delivered from memory.

As described in co-pending U.S. patent application Ser. No. 10/306,279 entitled "SYSTEM AND METHOD FOR MEASURING THE CAPACITY OF A STREAMING MEDIA SERVER" and in the L. Cherkasova Paper, a set of basic benchmark measurements may be used to derive a cost function that defines a fraction of system resources (e.g., the shared resources of a shared media server) needed to support a particular media stream depending on the stream bit rate and type of access (memory file access or disk file access), including the following costs:

A) $cost_{X_i}^{memory}$—a value of cost function for a stream with memory access to a file encoded at $X_i$ Kb/s; and
B) $cost_{X_i}^{disk}$—a value of cost function for a stream with disk access to a file encoded at $X_i$ Kb/s.

Many admission control strategies proposed in the existing literature use the "fixed" maximum bandwidth a server is capable of delivering as the main "scheduling" resource for admission of a new stream. Evidently, the amount of bandwidth a server is capable of delivering is variable and depends on the encoding bit rates of current streams in progress and the access type: memory versus disk.

One goal of an admission control mechanism is to prevent a media server from becoming overloaded. Overloading a media server typically results in violation of real-time properties of the media applications that it supports. Typically, an overloaded media server continues to serve all of the accepted streams but the quality of service degrades: the packets for accepted streams are sent with violation of "on-time delivery" and in such a way that the quality of the stream received by a client is compromised. Further, with a shared media server, an admission control mechanism as described herein may be implemented to ensure that a proper amount of resource usage is available to each of a plurality of hosting services implemented on the shared media server for servicing their respective requests.

As described above, a shared media server may comprise a plurality of hosting services implemented thereon. For instance, a shared media server may comprise a plurality "k" of hosting services s (i.e., $s_1, \ldots, s_k$), and embodiments of the present invention may be used for managing the amount of usage of the shared resources by each of the hosting services to ensure that each hosting service has a desired amount of resources available for its use. For instance, in certain embodiments, each hosting service $s_i$ may be allocated a predetermined amount of resource usage (or capacity), which may, for example, be allocated in accordance with the hosting services' respective SLAs, and an admission controller may be implemented to manage the admission of client requests for service to each of the hosting services to ensure that a desired amount of capacity is available for each hosting service. As described further below, certain embodiments utilize performance isolation to ensure that usage of the shared resources by one hosting service does not dominate an undesirably high amount of the shared resources so that other hosting services are assured of having a desired (e.g., predetermined) amount of resources available for their use.

Thus, an embodiment of the present invention provides an admission controller for managing admission of requests for streaming media files to a shared media server in a manner that ensures desired utilization of the media server's shared resources for servicing the requests received for a plurality of different hosting services implemented on the shared media server. For instance, in accordance with certain embodiments, the admission controller manages usage of the shared resources by a plurality of hosting services implemented on a shared media server to ensure that desired QoS guarantees are maintained for each of the hosting services.

The following notations are used herein:

ActReqs(t): the set of all requests that are currently in progress on the shared media server, i.e. "active" at time t;

ActReqs$_i$(t): the set of active requests of hosting service $s_i$ at time t;

TermReqs(t): the set of all requests that are suppose to terminate at event time t;

TermReqs$_i$(t): the set of requests of hosting service $s_i$ that are suppose to terminate at event time t;

Cap: the absolute server capacity. In an example embodiment, the Cap is set to 1, and the cost function for requests is derived using this setting. For example, if a media server can support N concurrent disk accesses to files encoded at $X_i$ Kb/s then the cost $COSt_{x_i}^{disk}$ of the disk request to a file encoded at XKb/s is $$\frac{1}{N};$$

ACap(t): the available server capacity at time t. In the initial time point, one may use ACap($T_{init}$)=0.9×Cap; and ACap$_i$(t): the available capacity of hosting service $s_i$ at time t. In the initial time point $T_{init}$, one may use a corresponding SLA for defining the available capacity of hosting service $s_i$, $$i.e., ACap_i(T_{init}) = \frac{Z_i \times ACap(T_{init})}{100}.$$

In accordance with one embodiment, the admission controller performs two main procedures when evaluating whether a new request $r_{i\_new}^f$ to a hosting service $s_i$ can be accepted for service by a shared media server:

1) Resource Availability Check. During this procedure, a cost of a new request $r_{i\_new}^f$ is evaluated. To perform such evaluation, a current memory state of the shared media server is computed using a segment-based access model in the manner described above. From the memory state, the admission controller can identify whether a prefix of requested file f is residing in memory, and thus determine whether request $r_{i\_new}^f$ will have a cost of accessing memory or disk correspondingly. Then, the admission controller checks whether, in the current time (at which the request $r_{new}^f$ is received), the requested hosting service $s_i$ has enough available resources (capacity) to accommodate the resource requirements of such new request $r_{i\_new}^f$; and 2) Performance Isolation Guarantees Check. During this procedure, the admission controller verifies that the acceptance of request $r_{i\_new}^f$ will not violate the performance isolation guarantees at any point in the future for any of the plurality of hosting services implemented on the shared media server.

Figure 6:
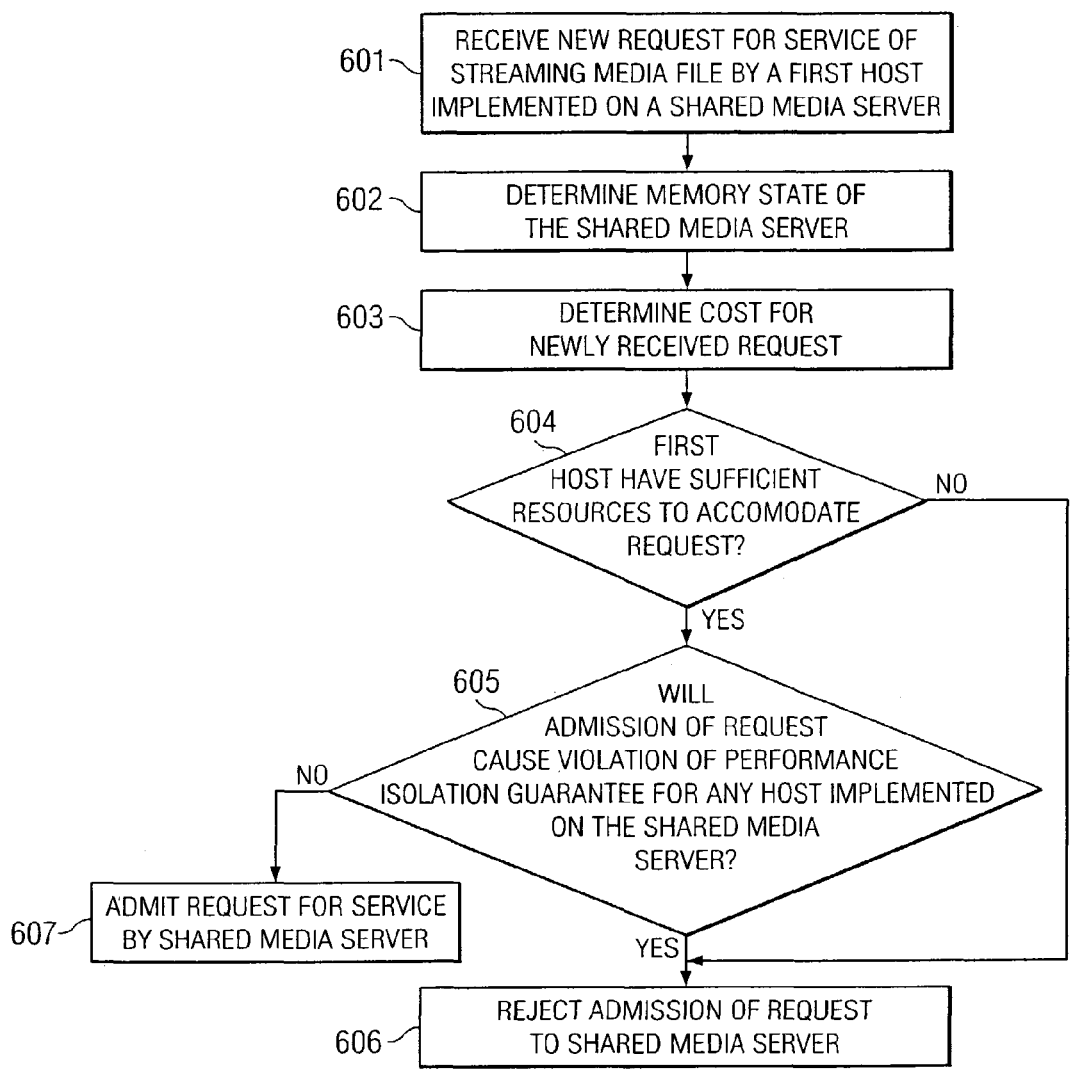
FIG. 6 shows an example operational flow diagram of one embodiment of an admission controller for a shared media server.

Turning to FIG. 6, an example operational flow diagram of one embodiment of an admission controller is shown. In operational block 601, the admission controller receives a new request $r_{i\_new}^f$ requesting service of a streaming media file from a first logical host (or "hosting service") implemented on a shared media server. In operational block 602, the current memory state of the shared media server is determined (e.g., using the techniques described above for computing a current memory state). In operational block 603, a cost for the newly received request is determined. For instance, the type of access of the request (e.g., whether a memory access or a disk access) may be determined, and a corresponding cost$^{memory}$ or cost$^{disk}$ may be determined for the request. As described further herein, the determined memory state (of block 602) may be used in block 603 for determining the cost of $r_{i\_new}^f$.

In operational block 604, the admission controller determines whether the first (requested) hosting service has sufficient available resources to accommodate the newly received request $r_{i\_new}^f$. That is, the computed cost of the newly received request is used to determined whether, given a predetermined amount of resource usage allowed for the first hosting service, the first hosting service currently has sufficient resource usage available for servicing the request. If the first hosting service does not have a sufficient amount of resource usage available to accommodate the newly received request, then operation advances to block 606 whereat the request is rejected (i.e., not admitted for service by the hosting service on the shared media server). Otherwise, if the hosting service has sufficient resource usage available to accommodate the request, operation advances to block 605.

In operational block 605, the admission controller determines whether admission of the newly received request $r_{i\_new}^f$ for service by the shared media server will cause violation of the performance isolation guarantee at any point in the future for any of the plurality of logical hosts implemented on the shared media server. As described further herein, by maintaining the guarantee of performance isolation for each hosting service s implemented on the shared media server, a desired QoS can be maintained for each of those hosting services. If admission of the request $r_{i\_new}^f$ will cause violation of the guarantee of performance isolation for any of the hosting services s, operation advances to block 606 whereat the request $r_{i\_new}^f$ is rejected (i.e., not admitted for service by the shared media server). Otherwise, if it is determined that admission of the request $r_{i\_new}^f$ will not cause a violation of the guarantee of performance isolation for any of the hosting services at any point in the future, operation advances to block 607 whereat request $r_{i\_new}^f$ is admitted for service by the shared media server.

In certain embodiments, a current memory state is computed for the shared media server in accordance with the techniques described above. From the memory state, the admission controller can identify, in response to a received request $r_{i\_new}^f$, whether a requested file f or its initial prefix is residing in the media server's memory, and thus whether the request $r_{i\_new}^f$ will have a cost of access to memory or disk correspondingly. If the requested hosting service $s_i$ (to which the new request $r_{i\_new}^f$ is made) has enough currently available capacity (i.e., sufficient amount of resource usage available) to accommodate the resource requirements of new request $r_{i\_new}^f$, as determined in block 604 of FIG. 6, then request $r_{i\_new}^f$ may be conditionally accepted. Otherwise, request $r_{i\_new}^f$ is rejected.

When there is enough currently available hosting service capacity to admit a new request $r_{i\_new}^f$, an embodiment of the admission controller still ensures that the acceptance of request $r_{i\_new}^f$ will not violate the performance isolation guarantees at any point in the future for any service $s_i (1 \leq i \leq k)$ implemented on the shared media server, such as in block 605 of FIG. 6. In particular, the admission controller assesses the following two situations:

1) Let a new request $r_{i\_new}^f$ of hosting service $s_i$ be a disk access. In this case, there is a continuous stream of new, additional bytes transferred from disk to memory (amount of new bytes is defined by the file f encoding bit rate). This may result in replacement (eviction) of some "old" file segments in memory, such as some segments of file f̂ of media service ŝ, for example. If there is an active request r̂$^f$ which reads the corresponding file segments from memory and has a cost of memory access, then once the corresponding segments of file f̂ are evicted (replaced) from memory, the request r̂$^f$ will read the corresponding segments of file f̂ from disk with increased cost of disk access. Accordingly, the admission controller assesses such situations whenever they may occur in the future for already accepted ("active") requests and evaluate whether the increased cost of impacted requests can be offset by the available capacity of the corresponding hosting service (such as ŝ in this example) at the corresponding time points; and 2) Let a new request $r_{i\_new}^f$ be a memory access. The admission controller assesses whether the corresponding segments of file f may be evicted in some future time points by already accepted active disk requests, and whether the increased cost of request $r_{i\_new}^f$ can be offset by the available capacity of hosting service $s_i$ at the corresponding time points. That is, if request $r_{i\_new}^f$ is initially accepted as a memory access (e.g., the prefix of file f is available in memory at time $T_{cur}$), it is determined whether such request may (before it is fully serviced) become a disk access request and whether the corresponding hosting service $s_i$ serving the file f will have sufficient resource usage available to support such a disk access request.

Because certain embodiments of the admission controller attempt to ensure the performance isolation guarantees at any point in the future, an efficient procedure to advance the "system clock" and verify the performance isolation guarantees on a small set of future time points may be implemented in the manner described further below. It should be noted that an aim of the performance isolation validation process and related speculative computations of certain embodiments is to provide a determination of whether the request $r_{i\_new}^f$ can be accepted or not for service by the requested hosting service ($s_i$) implemented on a shared media server and ensure a desired level of performance (or QoS) for all requests accepted for each of the plurality of hosting services $\{s_1, \ldots, s_k\}$ implemented on the shared media server.

Figure 7B:
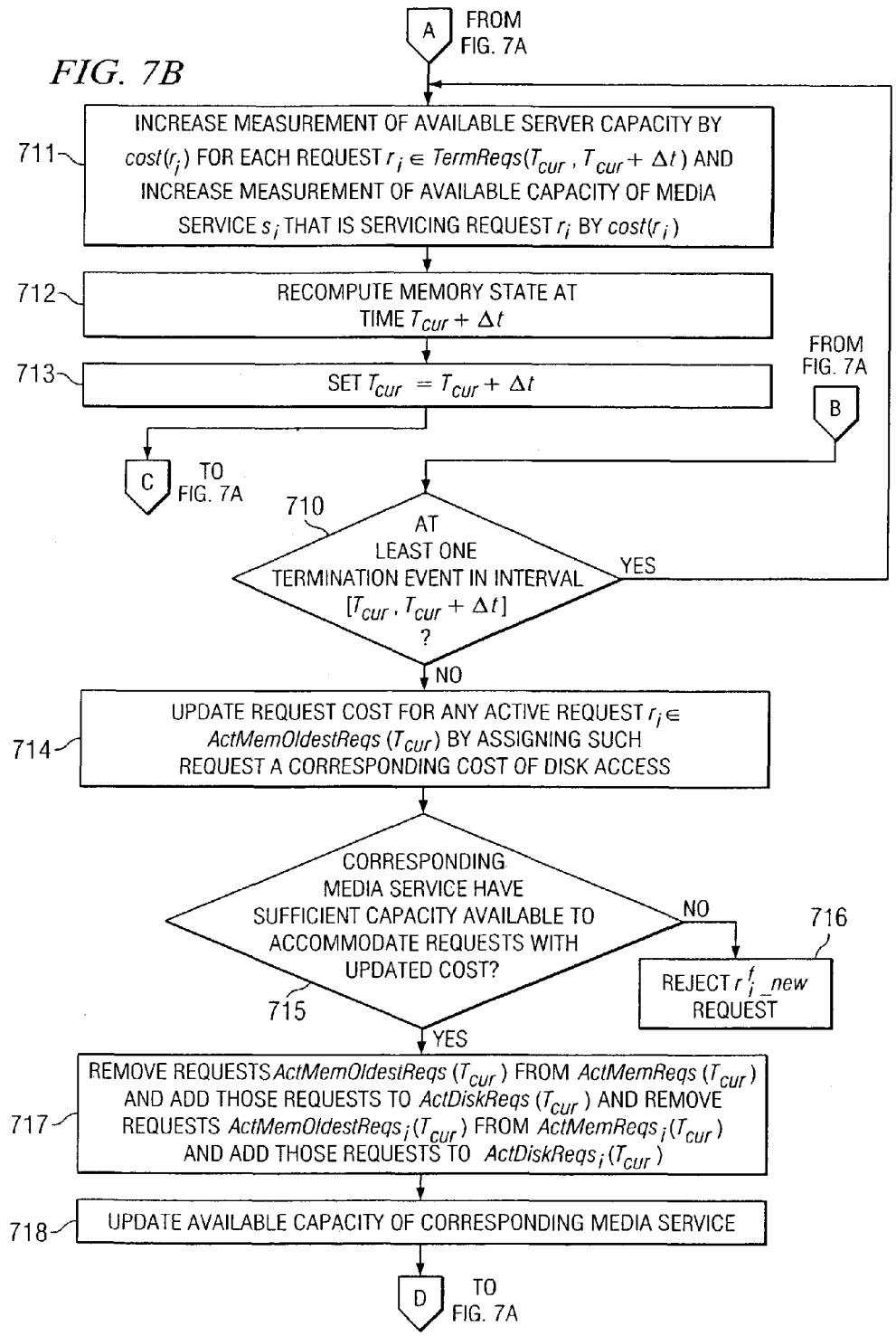

FIGS. 7A-7B show an example operational flow diagram for performance isolation validation that is performed by an admission controller in accordance with one embodiment of the present invention. For instance, such performance isolation validation process may be performed in block 605 of FIG. 6 in the overall operation of an embodiment of an admission controller. In accordance with the example embodiment for implementing performance isolation validation of FIGS. 7A-7B, in determining whether a received request $r_{i\_new}^f$ can be accepted for service by a hosting service $s_i$ of the shared media server, the admission controller identifies "safely replaceable bytes" in memory. More particularly, in the example embodiment of FIGS. 7A-7B, all of the active requests ActReqs($T_{cur}$) are partitioned in two groups:

1) ActMemReqs($T_{cur}$): active memory requests, i.e. the requests which have a memory access cost; and
2) ActDiskReqs($T_{cur}$): active disk requests, i.e. the requests which have a disk access cost.

For instance, in block 701, all ActMemReqs($T_{cur}$) are identified, and in block 702 all ActDiskReqs($T_{cur}$) are identified. The requests from ActMemReqs($T_{cur}$) access their file segments in memory. Thus, they do not "bring" new bytes to memory—they only "refresh" the accessed file segments' timestamps with the current time. Only requests from ActDiskReqs($T_{cur}$) bring new bytes from disk to memory and evict the corresponding amount of "oldest" bytes from memory.

There are simple dependencies between requests to the same file f. For instance, let Reqs($T_{cur}$)=$\{r_1^f, r_2^f, \ldots, r_n^f\}$ be a sequence of requests accessing file f in interval $[T_{cur}^{mem}, T^{cur}]$ and let $t^{start}(r_1^f) \leq t^{start}(r_2^f) \leq \ldots \leq t^{start}(r_n^f)$, i.e. $(r_1^f)$ is the oldest access and $(r_n^f)$ is the most recent access to a file f in $[T_{cur}^{mem}, T_{cur}]$ interval. Let request $r_i^f (1 \leq i \leq n)$ be a memory access. Since request $r_i^f$ reads the initial segment of file f from memory, and the most recent initial segment of file f in memory is written by the previous request $r_{i-1}^f$, there is the following dependency between accesses $r_i^f$ and $r_{i-1}^f$. The offset $(t^{start}(r_i^f) - t^{start}(r_{i-1}^f))$ between the arrival times of requests $r_{n-1}^f$ and $r_n^f$ indicates the timestamp of the file segment in memory, which currently is accessible by request $r_i^f$:

$$T_{cur}^{act\_m}(r_n^f) = T_{cur} - (t^{start}(r_i^f) - t^{start}(r_{i-1}^f)).$$

As shown in operational block 703, this example embodiment of the admission controller applies the above computation to each active memory request in ActMemReqs($T_{cur}$):

$$T_{cur}^{act\_m} \min_{r_i \in ActMemReqs(T_{cur})} T_{cur}^{act\_m}(r_i).$$

Time point $T_{cur}^{act\_m}$ indicates the timestamp of the "oldest-active" portion in memory, which is currently used (read) by some active memory requests. Any active memory request r such that $T_{cur}^{act\_m}(r) = T_{cur}^{act\_m}$ is referred to as an active memory-oldest request.

In operational block 704, TimeFileTable($T_{cur}^{mem}, T_{cur}$), which provides time ordering of file segments in memory, is used to identify all the file segments stored between $T_{cur}^{mem}$ and $T_{cur}^{act\_m}$ and compute the corresponding amount of bytes in memory between these two time points as:

$$SafeReplBytes(T_{cur}) = UniqueBytes(T_{cur}^{mem}, T_{cur}^{act\_m}).$$

Figure 8:
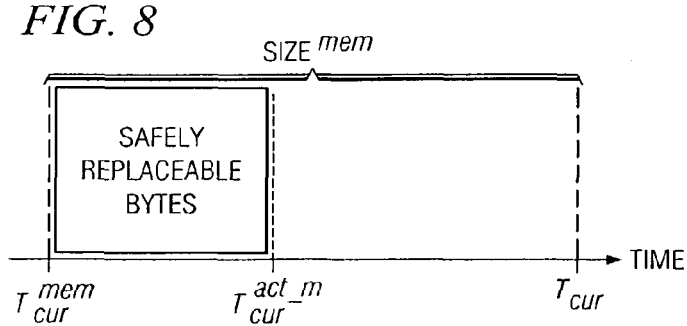
FIG. 8 shows an example of safely replaceable bytes that may be determined for a media server's memory.

Thus, the computed SafeReplBytes($T_{cur}$) are the bytes that can be safely replaced in memory (e.g., by new bytes being read from disk) without impacting any currently active memory requests. For instance, turning briefly to FIG. 8, an example of such safely replaceable bytes that may be determined is shown.

Returning to FIGS. 7A-7B, this example embodiment of an admission controller next logically advances the system clock. That is, a logical system clock is advanced to enable evaluation of the media server's performance (and/or the performance of the hosting services implemented thereon) at some time in the future. For instance, the logical system clock may be advanced to a particular point in future to determine how the media server will manage its load at that point in future. Thus, the admission controller may be forward-looking to anticipate the state of the media server at point(s) in the future, and can thus evaluate how the media server's future state will be impacted by actions taken currently, such as admitting a newly received request $r_{i\_new}^f$, as described further below.

As shown in operational block 705, the admission controller may use the information about file encoding bit rates as well as the future termination times for requests ActDiskReqs ($T_{cur}$) to compute a time duration $\Delta t$ during which the requests from AetDiskReqs($T_{cur}$) will either transfer from disk to memory the amount of bytes equal to SafeReplBytes ($T_{cur}$) or all of them terminate. It is safe to advance clock to time $T_{cur}+\Delta t$ because during this time period the cost of accepted requests stays unchanged, and therefore the media server is guaranteed from entering the overloaded state in interval [$T_{cur},T_{cur}+\Delta t$]. In order to make the performance isolation validation process terminate within a limited number of steps, this embodiment attempts to advance the clock at each step either beyond the closest termination event or beyond a designated ClockAdvanceTime. ClockAdvanceTime is a parameter, which may be set depending, for example, on a workload presented to the media server. For instance, for a workload with long duration streams (e.g., long videos), ClockAdvanceTime might be set to 1 minute or higher, while for a workload with short duration streams, ClockAdvanceTime might be set, for example, to 5 seconds.

In operational block 706, the admission controller determines if in interval [$T_{cur},T_{cur}+\Delta t$] all the requests from Act-DiskReqs($T_{cur}$) have reached their termination. If all of the requests from ActDiskReqs($T_{cur}$) are determined in block 706 to reach their termination in interval [$T_{cur},T_{cur}+\Delta t$], operation advances to block 708 whereat request $r_{i\_new}^f$ is admitted for service by the shared media server. Alternatively, operation advances to block 707 and the admission controller determines if in interval [$T_{cur},T_{cur}+\Delta t$] all the requests from ActMemReqs($T_{cur}$) have reached their termination. If all of the requests from ActMemReqs($T_{cur}$) are determined in block 707 to reach their termination in interval [$T_{cur},T_{cur}+\Delta t$], operation advances to block 708 whereat request $r_{i\_new}^f$ is admitted for service by the shared media server. More specifically, if either of the conditions of blocks 706 and 707 are found to be satisfied, then the shared media server is guaranteed from entering an overloaded state and performance isolation for the plurality of hosting services implemented on the shared media server are guaranteed in the case of request $r_{i\_new}^f$ being accepted, and thus such request is accepted for service in block 708.

Otherwise, operation advances to block 709 whereat the admission controller determines if $\Delta t \geq$ ClockAdvanceTime. If $\Delta t \geq$ ClockAdvanceTime, operation advances to block 711 (via connector "A") shown in FIG. 7B, as described further below. Otherwise, operation advances to block 710 (via connector "B") shown in FIG. 7B, whereat the admission controller determines whether there is one or more termination events within interval [$T_{cur},T_{cur}+\Delta t$]. If one or more termination events are determined within interval [$T_{cur},T_{cur}+\Delta t$], operation advances to block 711, which is described further below—otherwise, operation advances from block 710 to block 714.

Let TermReqs ($T_{cur},T_{cur}+\Delta t$) denote all the requests which terminate in interval [$T_{cur},T_{cur}+\Delta t$]. In operational block 711, the available server capacity is increased by cost ($r_i$) for each request $r_i \in$ TermReqs($T_{cur},\Delta T$). Similarly, for each request $r_i$ of hosting service $s_i(r_i \in$ TermReqs$_i(T_{cur},\Delta T))$ that is determined to terminate in interval [$T_{cur},T_{cur}+\Delta t$], the available capacity of media service $s_i$ is increased by cost($r_i$). Then, in operational block 712, the admission controller computes an updated memory state and all of the corresponding data structures (e.g., the segment-based models) at time point $T_{cur}+\Delta t$. After that, the whole procedure is repeated with respect to $T_{cur}=T_{cur}+\Delta t$. Thus, in operational block 713, time $T_{cur}$ set to $T_{cur}+\Delta t$, and operation returns to block 701 of FIG. 7A (via connector "C") to repeat the above-described processes with respect to $T_{cur}=T_{cur}+\Delta t$.

If $\Delta t \leq$ ClockAdvanceTime (in operational block 709 of FIG. 7A) and there is no termination events within interval [$T_{cur},T_{cur}+\Delta t$] (in operational block 710 of FIG. 7B), operation advances to block 714 shown in FIG. 7B. Let ActMemOldestReqs($T_{cur}$)={$r_i, \ldots ,r_k$} be a set of all active memory-oldest requests, i.e. for any $r_i$:$T_{cur}^{act\_m}(r_i) = T_{cur}^{act\_m}$, ($1 \leq i \leq k$). Also, let ActMemOldestReqs$_i(T_{cur})$= {$r_i, \ldots ,r_{k_j}$} be the active memory-oldest requests of hosting service $s_i$, ($1 \leq i \leq k$) implemented on the shared media server, wherein ActMemOldestReqs$_i(T_{cur}) \subseteq$ ActMemOldest Reqs ($T_{cur}$). That is, a plurality, "k," of hosting services may be implemented on the shared media server, and ActMemOldestReqs$_i(T_{cur})$={$r_i, \ldots ,r_{k_j}$} are the active memory-oldest requests of hosting service $s_i$, ($1 \leq i \leq k$) of the shared media server.

The active memory-oldest requests are accessing the file segments with the "oldest" timestamps in memory, and therefore, they are the most vulnerable to a situation that corresponding file segments can be evicted from memory. If this happens (i.e., their corresponding file segments are evicted from memory), these requests will incur the increased cost of disk access, and thus the admission controller attempts to identify those occurrences and ensure that there is enough available capacity of the corresponding hosting service $s_i$ to offset this additional cost. Accordingly, in operational block 714, for any $r_i \in$ ActMemOldestReqs($T_{cur}$) the admission controller assigns a corresponding cost of disk access (such process is referred to herein as a request cost update).

In operational block 715, the admission controller determines whether there is sufficient available capacity of the corresponding hosting services to offset this additional cost. If there is not enough available capacity of the corresponding hosting services to offset the corresponding request cost updates, then the end of the performance isolation validation process is reached and request $r_{i\_new}^f$ rejected in block 716. If, on the other hand, there is enough available capacity of the corresponding hosting service $s_i$ to offset the corresponding request cost updates, then requests ActMemOldestReqs($T_{cur}$) are removed from ActMemReqs($T_{cur}$) and are added to Act-DiskReqs($T_{cur}$), as well as ActMemOldestReqs$_i(T_{cur})$ are removed from ActMemReqs$_i(T_{cur})(1 \leq i \leq k)$ and are added to ActDiskReqs$_i(T_{cur})(1 \leq i \leq k)$ in operational block 717. And, in operational block 718, the available capacity of the corresponding hosting services are correspondingly updated (e.g., decreased). After that, time point $T_{cur}^{act\_m}$ is recomputed with respect to an updated set of ActMemReqs($T_{cur}$), and operation returns to block 703 of FIG. 7A (via connector "D") and the process continues for the updated data structures.

The performance isolation validation process described above in FIGS. 7A-7B guarantees to terminate and to provide the answer whether request $r_{i\_new}^{f}$ should be accepted or not.

In an embodiment of the admission controller, two types of events may be encountered by the controller: 1) acceptance of new requests, and 2) termination of previously accepted (active) requests. In these time points, the amount of available capacity (or resource usage) for the hosting services is reevaluated by the controller. For instance, in the event of an acceptance of a new request, additional server resources may be allocated for servicing the new request (thus decreasing the amount of server resources available to the corresponding hosting service), and in the event of termination of an active request, server resources allocated for servicing such terminated request may be released (thus increasing the amount of server resources available to the corresponding hosting service). It should be understood that multiple events may be encountered in the same time point.

An embodiment of the admission controller handles events as described below. Let the current event time (i.e., a time at which an event is encountered or detected by the admission controller) be Tcur If there are events of both types: termination of some already accepted (active) requests and acceptance of a new request, then the termination event activities are performed first (the corresponding resources are released), and the acceptance event activities are performed after that. An example embodiment of the admission controller performs the actions described below depending on the event type.

First, let us consider the actions of an example embodiment of the admission controller for an acceptance of a new request event. To evaluate whether a new request $r_{i\_new}^{f}$ to media service $s_i$ can be accepted at time $T_{cur}$, the admission controller performs the following two procedures: 1) Resource Availability Check and 2) Performance Isolation Guarantees Check, which are each described further below.

During the Resource Availability Check procedure, a cost of a new request $r_{i\_new}^{f}$ is evaluated via computation of a current memory state of the media server as described above. In particular, this example embodiment of the admission controller computes a timestamp $T_{cur}^{mem}$ such that only file segments accessed at time $T_{cur}^{mem}$ and later are residing in memory. Additionally, for each request $r \in$ ActMemReqs($T_{cur}$), the admission controller computes timestamp $T_{cur}^{act\_m}(r)$ corresponding to the oldest-active portion of memory which currently is accessible by the active memory requests. After that, the admission controller identifies if there are any requests $r \in$ ActMemReqs($T_{cur}$) such that $T_{cur}^{act\_m}(r) \leq T_{cur}^{mem}$. This situation reflects that while request r has been originally a memory access, the current memory state has changed and request r at time $T_{cur}^{mem}$ streams the corresponding bytes from disk. Hence, access r requires a corresponding cost update. Let UpdReqs denote all such requests (this set may be empty). Since the performance isolation validation process described above in conjunction with FIGS. 7A-7B guarantees that there is enough available capacity of the corresponding hosting services in the future time points, the admission controller runs a procedure of cost update for requests $r \in$ UpdReqs: for any $r \in$ UpdReqs, the admission controller assigns a corresponding cost of disk access, these requests are removed from ActMemReqs($T_{cur}$) and are added to ActDiskReqs($T_{cur}$), and the available server capacity is correspondingly decreased. For example, let r be a request of hosting service $s_j$; then, r is removed from ActMemReqs$_j$ ($T_{cur}$) and is added to ActDiskReqs$_j$($T_{cur}$), and the available capacity of hosting service $s_j$ is correspondingly decreased.

Then, the admission controller checks whether the hosting service $s_i$ still has enough available resources (capacity) to accommodate the resource requirements of a new request $r_{i\_new}^{f}$. In case of a positive outcome (i.e., the admission controller determines that the hosting service $s_i$ still has sufficient capacity to service the new request), the admission controller moves on to the performance isolation validation process, described below.

During the Performance Isolation Guarantees Check procedures, this example embodiment of the admission controller verifies that by accepting the new request $r_{i\_new}^{f}$ the media server will not violate, at any point in the future, the performance isolation guarantees of any hosting service implemented on the shared media server, as described above in conjunction with FIGS. 7A-7B. If the outcome of this performance isolation validation process is positive (i.e., it is determined that the performance isolation guarantees of all of the hosting services will not be violated at any point in the future), then new request $r_{i\_new}^{f}$ is accepted and the following actions are performed:

the available server capacity is decreased by the $\text{cost}(r_{i\_new}^{f}): ACap(T_{cur}) = ACap(T_{cur}) - \text{cost}(r_{i\_new}^{f});$ the available capacity of hosting service $s_i$ is decreased by the $\text{cost}(r_{i\_new}^{f}): ACap_i(T_{cur}) = ACap_i(T_{cur}) - \text{cost}(r_{i\_new}^{f});$ $ActReqs(T_{cur}) = ActReqs(T_{cur}) \cup r_{i\_new}^{f};$ $ActReqs_i(T_{cur}) = ActReqs_i(T_{cur}) \cup r_{i\_new}^{f};$ let T'=$T_{cur}$+duration (then TermReqs(Tα)=TermReqs(T')$\cup r_{i\_new}^{f}$; and let T'=$T_{cur}$+duration ($r_{i\_new}^{f}$), then TermReqs$_i$(T')=TermReqs$_i$(T')$\cup r_{i\_new}^{f}$.

Now let us consider the actions of an example embodiment of the admission controller for termination of currently accepted (active) requests. In the time points corresponding to termination events, the following actions are performed:

$ActReqs(T_{cur}) = ActReqs(T_{cur}) \setminus TermReqs(T_{cur});$ $ActReqs_i(T_{cur}) = ActReqs_i(T_{cur}) \setminus TermReqs_i(T_{cur}),$
 $(1 \leq i \leq k);$ The server capacity is increased by the cost of the terminated requests:

$$ACap(T_{cur}) = ACap(T_{cur}) + \sum_{r \in TermReqs(T_{cur})} \text{cost}(r); \text{ and}$$

The capacity of hosting service $s_i$ is increased by the cost of the terminated requests:

$$ACap_i(T_{cur}) = ACap_i(T_{cur}) + \sum_{r \in TermReqs_i(T_{cur})} \text{cost}(r).$$

Embodiments of the present invention may be utilized to model the memory of a media server. Such a memory model may be used, for example, in implementing an admission control policy for the media server for managing the acceptance of client requests to be serviced by the media server (e.g., to ensure optimal resource utilization and/or a desired level of quality of service). For instance, the memory of a media server may be modeled during its runtime, and such memory model may be utilized for measuring the capacity of the media server in supporting actual workloads applied thereto by a population of clients. For example, the capacity of the media server may be measured in accordance with the teachings of co-pending U.S. patent application Ser. No. 10/306,279 titled "SYSTEM AND METHOD FOR MEASURING THE CAPACITY OF A STREAMING MEDIA SERVER," using the memory model for determining the current memory state of the media server. Thus, when actually implemented in a client-server network, a media server's capacity (e.g., its available capacity) may be monitored for supporting actual workloads applied thereto using a derived cost function, as described in co-pending U.S. patent application Ser. No. 10/306,279 titled "SYSTEM AND METHOD FOR MEASURING THE CAPACITY OF A STREAMING MEDIA SERVER." This is particularly attractive in systems in which resources may be dynamically allocated, such as in Utility Data Centers (UDCs), for supporting the applied workloads.

It should be understood that while the example embodiments described above use the cost functions, as derived in co-pending U.S. patent application Ser. No. 10/306,279 entitled "SYSTEM AND METHOD FOR MEASURING THE CAPACITY OF A STREAMING MEDIA SERVER" and in the L. Cherkasova Paper, application of the present invention is not intended to be limited solely to those cost functions. Rather, in alternative embodiments the memory modeling approach described herein may be used for implementing other admission control strategies now known or later developed, including other cost-aware admission control strategies.

Figure 9:
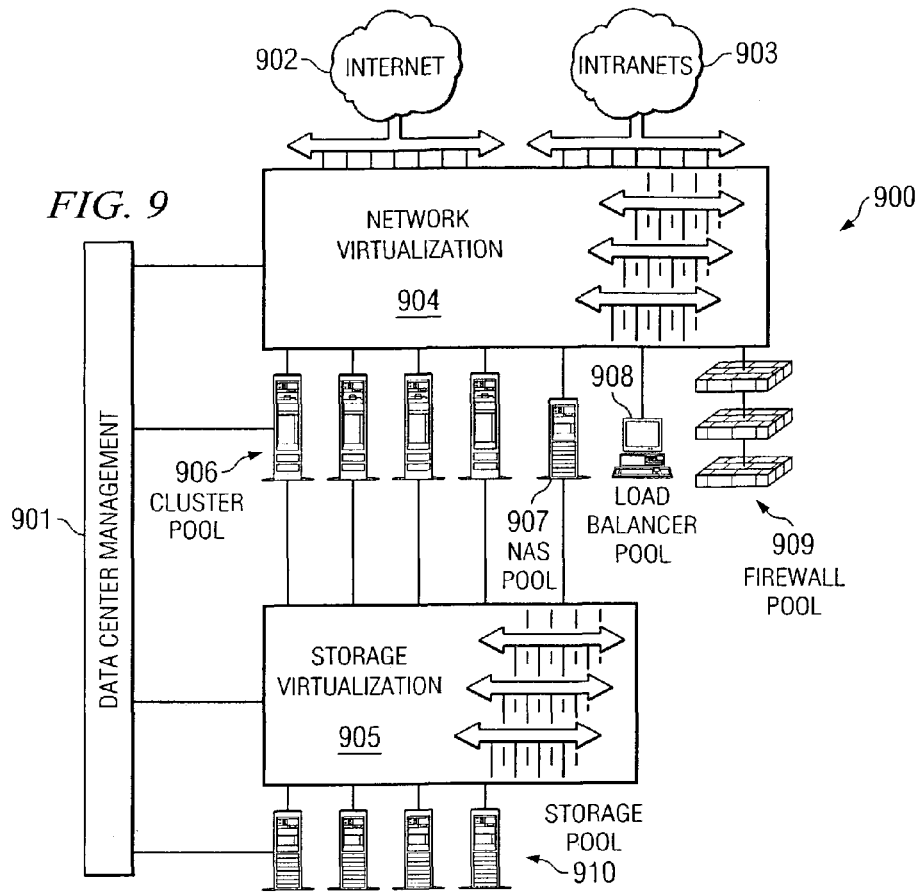
FIG. 9 shows an example Utility Data Center arrangement in which resources may be dynamically allocated and in which certain embodiments of the present invention may be implemented.

FIG. 9 shows an example UDC 900 in which resources may be dynamically allocated. Such a UDC 900 may be used for implementing a media server complex in which resources are dynamically allocated for the media server responsive to the workload applied thereto in accordance with the measured capacity of the media server. More specifically, such a UDC 900 may be implemented as a shared media server, wherein its resources (which may be dynamically allocated) are shared by a plurality of hosting services. Implementations of UDC 900 are known in the art and therefore UDC 900 is only briefly described herein. As shown in FIG. 9, UDC 900 comprises data center management logic 901 that is operable to manage the allocation of resources in UDC 900. UDC 900 is coupled to a communications network, such as the Internet 1302 and/or Intranets 1303, thus enabling access by clients (not shown) via such communication networks. Network virtualization logic 904 and storage virtualization logic 905 is also included. UDC 900 further comprises cluster pool 906, network-attached storage (NAS) pool 907, load balancer pool 908, firewall pool 909, and storage pool 910. Again, data center management logic 901 is operable to manage the allocation of resources, such as resources available in cluster pool 906, NAS pool 907, and storage pool 910. Thus, by modeling the current memory state of a media server in accordance with embodiments of the present invention and using such memory state for computing a cost function for measuring the capacity of the media server complex under an applied workload as described in co-pending,U.S. patent application Ser. No. 10/306,279 titled "SYSTEM AND METHOD FOR MEASURING THE CAPACITY OF A STREAMING MEDIA SERVER," data center management logic 901 may, responsive to the measured capacity, dynamically allocate the appropriate resources for supporting the applied workload. Further, embodiments of the present invention maybe utilized for managing usage of the shared resources of UDC 900 by a plurality of hosting resources in the manner described above.

When implemented via computer-executable instructions, various elements of embodiments of the present invention for modeling a media server's memory are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information.

Figure 10:
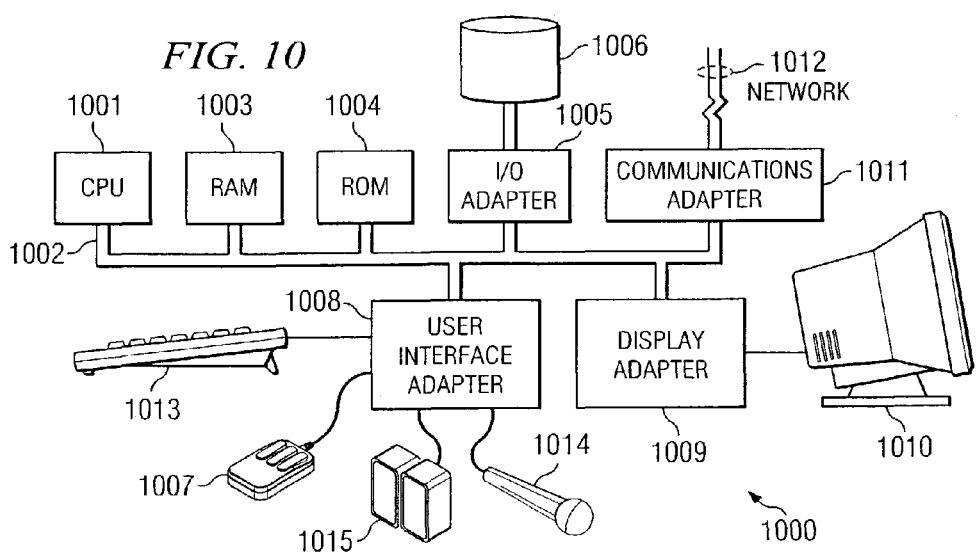
FIG. 10 shows an example computer system on which embodiments of the present invention may be implemented.

FIG. 10 illustrates an example computer system 1000 adapted according to embodiments of the present invention. That is, computer system 1000 comprises an example system on which embodiments of the present invention may be implemented. Central processing unit (CPU) 1001 is coupled to system bus 1002. CPU 1001 may be any general purpose CPU. The present invention is not restricted by the architecture of CPU 1001 as long as CPU 1001 supports the inventive operations as described herein. CPU 1001 may execute the various logical instructions according to embodiments of the present invention. For example, CPU 1001 may execute machine-level instructions according to the exemplary operational flows described above in conjunction with FIGS. 6, 7A, and 7B. For instance, example computer system 1000 may comprise a shared media server for implementing the above-described operations of an embodiment of the present invention, or example computer system 1000 may comprise an admission controller that is included in a shared media server or is communicatively coupled to a shared media server for implementing the above-described operations of an embodiment of the present invention, as examples. Embodiments of the present invention may be utilized for managing usage of the shared resources of example comptuer system 1000 by a plurality of hosting resources in the manner described above.

Computer system 1000 also preferably includes random access memory (RAM) 1003, which may be SRAM, DRAM, SDRAM, or the like. Computer system 1000 preferably includes read-only memory (ROM) 1004 which may be PROM, EPROM, EEPROM, or the like. RAM 1003 and ROM 1004 hold user and system data and programs, as is well known in the art.

Computer system 1000 also preferably includes input/output (I/O) adapter 1005, communications adapter 1011, user interface adapter 1008, and display adapter 1009. I/O adapter 1005, user interface adapter 1008, and/or communications adapter 1011 may, in certain embodiments, enable a user to interact with computer system 1000 in order to input information thereto.

I/O adapter 1005 preferably connects storage device(s) 1006, such as one or more of hard drive, compact disc (CD) drive, floppy disk drive, tape drive, etc. to computer system 1000. The storage devices may be utilized when RAM 1003 is insufficient for the memory requirements associated with storing data for application programs. Communications adapter 1011 is preferably adapted to couple computer system 1000 to network 1012 (e.g., network 103 of FIG. 1).

User interface adapter 1008 couples user input devices, such as keyboard 1013, pointing device 1007, and microphone 1014 and/or output devices, such as speaker(s) 1015 to computer system 1000. Display adapter 1009 is driven by CPU 1001 to control the display on display device 1010.

It shall be appreciated that the present invention is not limited to the architecture of system 1000. For example, any suitable processor-based device may be utilized, including without limitation personal computers, laptop computers, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

What is claimed is:

1. A method for managing admission of requests to a shared media server, the method comprising:
allowing each of a plurality of hosting services access to any of a set of shared resources for serving their respective streaming files to clients, wherein said set of shared resources comprises memory; and
managing admission of client requests for streaming files to each of the plurality of hosting services to ensure that a desired amount of usage of the shared resources is available to each hosting service, wherein said managing admission of client requests for streaming files comprises:
receiving a client request for a streaming file to be served from one of said hosting services; and
using a segment-based memory model to determine whether at least a portion of the requested streaming file is in the memory.

2. The method of claim 1 further comprising:
implementing the plurality of hosting services on a shared media server.

3. The method of claim 1 wherein the set of shared resources comprises:
shared memory resources and shared disk resources.

4. The method of claim 1 further comprising:
determining the desired amount of usage of the shared resources for a hosting service from a service level agreement.

5. The method of claim 1 further comprising:
determining from the segment-based memory model a cost associated with the one of said hosting services serving the requested streaming file.

6. The method of claim 1 wherein said managing admission of client requests for streaming files comprises:
receiving a new request for service of a streaming file by one of the plurality of hosting services;
performing a resource availability check for the one of a plurality of hosting services to determine whether the requested hosting service has sufficient available resource usage allocated thereto to service the new request.

7. The method of claim 6 wherein said managing admission of client requests for streaming files further comprises:
performing a performance isolation guarantee check for the plurality of hosting services to determine whether acceptance of the new request will violate, at any point in the future, availability of a desired amount of usage of the shared resources for any of the plurality of hosting services.

8. The method of claim 1 further comprising:
specifying, for each of the plurality of hosting services, a desired amount of usage of the shared resources to be available at any given time for the hosting service.

9. The method of claim 8 wherein said managing admission of client requests comprises:
managing admission of client requests for streaming files to each of the plurality of hosting services to ensure that each of the plurality of hosting services has usage of its corresponding specified desired amount of the shared resources.

10. A method comprising:
allowing each of a plurality of hosting services access to any of a set of shared resources for serving their respective files to clients thereof, wherein the shared resources includes a memory;
receiving, at a time $T_{cur}$, a new request for a streaming file to be served by one of the hosting services;
creating a segment-based model of the memory as of time $T_{cur}$; and
based at least in part on the segment-based model of the memory, determining whether to accept the received request for service by the hosting service.

11. The method of claim 10 further comprising:
for each of the plurality of hosting services, identifying a desired amount of usage of the set of shared resources to be available at any time for the hosting service.

12. The method of claim 10 wherein said determining whether to accept the received request for service by the hosting service comprises:
determining whether the requested hosting service has sufficient available resource usage allocated thereto to service the received request; and
determining whether acceptance of the received request for service by the requested hosting service will violate, at any point in the future, availability of a desired amount of usage of the shared resources for any of the plurality of hosting services.

13. The method of claim 10 wherein said segment-based model of the memory comprises (a) identification of unique segments of streaming files previously accessed by clients and (b) identification of corresponding timestamps of most recent accesses of each unique segment.

14. An admission controller for managing admission of requests to hosting services that share resources, the admission controller comprising:
means for receiving a new request for a streaming file to be served by one of a plurality of hosting services that share access to a set of shared resources for serving their respective files to clients thereof;
means for performing a resource availability check for the one of a plurality of hosting services from which the streaming file is requested by the new request to determine whether the requested hosting service has sufficient available resource usage allocated thereto to service the new request; and
means for performing performance isolation guarantee check for the plurality of hosting services to determine whether acceptance of the new request will violate, at any point in the future, availability of a desired amount of usage of the shared resources for any of the plurality of hosting services.

15. The admission controller of claim 14 wherein said means for performing a resource availability check comprises:
means for determining a cost associated with the one of a plurality of hosting services serving the requested streaming media file, wherein the cost corresponds to the shared resources to be consumed in serving the requested streaming file.

16. The admission controller of claim 14 wherein said set of shared resources comprises:
memory and disk resources.

17. A system comprising:

a media server comprising a plurality of hosting services for streaming files implemented thereon, wherein the media server comprises shared resources and wherein the plurality of hosting services share usage of the media server's shared resources in serving streaming files to their respective clients; and an admission controller for managing admission of client requests for service to each of the plurality of hosting services to ensure that no one of the plurality of hosting services overtakes usage of an undesirably high proportion of the shared resources;

wherein said admission controller is operable to receive a new request for service of a streaming file by one of the plurality of hosting services, and determine whether the requested hosting service has sufficient available resource usage allocated thereto to service the new request;

wherein said admission controller is further operable to determine whether acceptance of the new request will violate, at any point in the future, availability of a desired amount of usage of the shared resources for any of the plurality of hosting services wherein the admission controller is operable to use a segment-based model of the memory resources to determine whether at least a portion of a requested streaming file is in the memory resources.

18. A method for managing admission of requests to a hosting service, the method comprising:

allowing each of a plurality of hosting services access to any of a set of shared resources for serving their respective files to clients thereof;

for each of the hosting services, identifying a desired amount of usage of the set of shared resources to be available for the hosting service;

receiving a new request for a streaming file to be served by one of the hosting services;

determining, based at least in part on a modeled memory state of the shared resources, a cost to the one of the hosting services for serving the requested streaming file, wherein the cost corresponds to the shared resources to be consumed in serving the requested streaming file; and determining, based at least in part on the cost, whether to admit the new request for service by the one of the hosting services; and wherein said determining said cost, based at least in part on a modeled memory state of the shared resources, comprises:

determining, based at least in part on a segment-based model of memory of the shared resources.

* * * * *

UNITED STATES PATENT AND TRADEMARK OFFICE
CERTIFICATE OF CORRECTION

PATENT NO. : 7,779,096 B2
APPLICATION NO. : 10/601357
DATED : August 17, 2010
INVENTOR(S) : Ludmila Cherkasova It is certified that error appears in the above-identified patent and that said Letters Patent is hereby corrected as shown below:

In column 35, line 34, in Claim 4, delete "claim I" and insert -- claim 1 --, therefor.

In column 37, line 24, in Claim 17, after "services" insert -- ; and --.

Signed and Sealed this

Fourteenth Day of December, 2010

David J. Kappos
*Director of the United States Patent and Trademark Office*